US012707057B2

(12) United States Patent
Oh et al.

(10) Patent No.: US 12,707,057 B2
(45) Date of Patent: Aug. 11, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD BASED ON ATTRIBUTE DATA BASED ON SUBSAMPLED POINT

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 47 days.

(21) Appl. No.: 17/912,428

(22) PCT Filed: Jan. 11, 2021

(86) PCT No.: PCT/KR2021/000329
§ 371 (c)(1),
(2) Date: Sep. 16, 2022

(87) PCT Pub. No.: WO2021/201390
PCT Pub. Date: Oct. 7, 2021

(65) Prior Publication Data

US 2023/0111994 A1 Apr. 13, 2023

(30) Foreign Application Priority Data

Apr. 3, 2020 (KR) ........................ 10-2020-0041193

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/129* (2014.11); *H04N 19/136* (2014.11); *H04N 19/88* (2014.11)

(58) Field of Classification Search
None
See application file for complete search history.

(56) References Cited

U.S. PATENT DOCUMENTS 11,595,670 B2 * 2/2023 Aksu ...................... H04N 19/70
11,627,314 B2 * 4/2023 Tourapis ............. H04N 19/184
375/240.18

(Continued)

FOREIGN PATENT DOCUMENTS

| KR | 1020200007734 A | 1/2020 |
|---|---|---|
| WO | 2019142164 A1 | 7/2019 |
| WO | 2020060813 A1 | 3/2020 |

*Primary Examiner* — Edemio Navas, Jr.
(74) *Attorney, Agent, or Firm* — Bryan Cave Leighton Paisner LLP

(57) ABSTRACT

A point cloud data processing method according to embodiments is to encode and transmit point cloud data and may comprise the steps of: encoding a geometry indicating positions of one or more points of the point cloud data; encoding attributes of the one or more points; and transmitting a bitstream including the encoded point cloud data. By the point cloud data processing method according to embodiments, point cloud data can be received and decoded.

20 Claims, 33 Drawing Sheets

(51) Int. Cl.

| | |
|---|---|
| ***H04N 19/129*** | (2014.01) |
| ***H04N 19/136*** | (2014.01) |
| ***H04N 19/88*** | (2014.01) |

(56) References Cited

U.S. PATENT DOCUMENTS

2019/0080483 A1* 3/2019 Mammou ................. G06T 7/50
2019/0087979 A1 3/2019 Mammou et al.
2020/0021856 A1* 1/2020 Tourapis ................ H04N 19/13
2021/0099711 A1* 4/2021 Tourapis .............. H04N 19/147
2021/0375004 A1* 12/2021 Sugio ...................... G06T 9/001

* cited by examiner

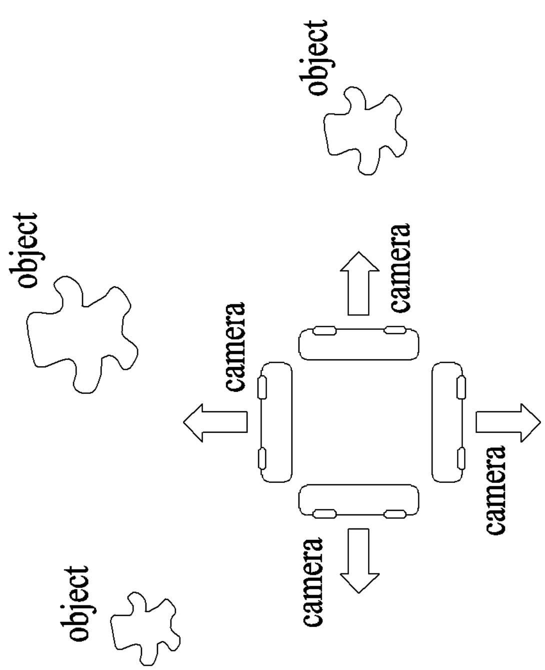
FIG. 3
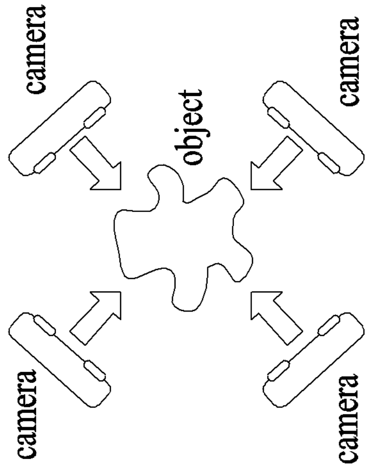

FIG. 7
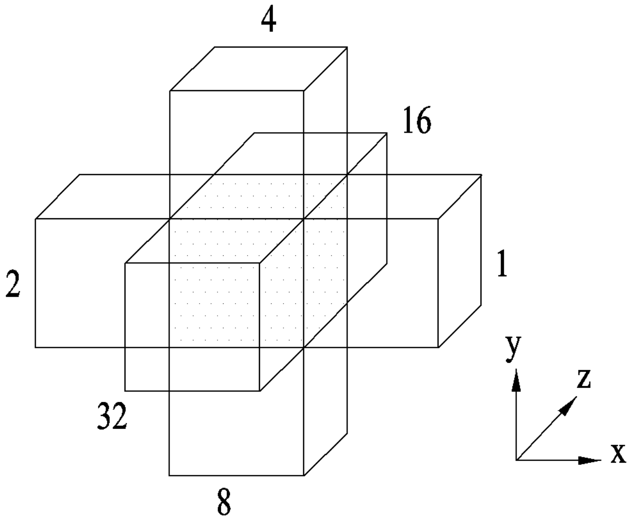
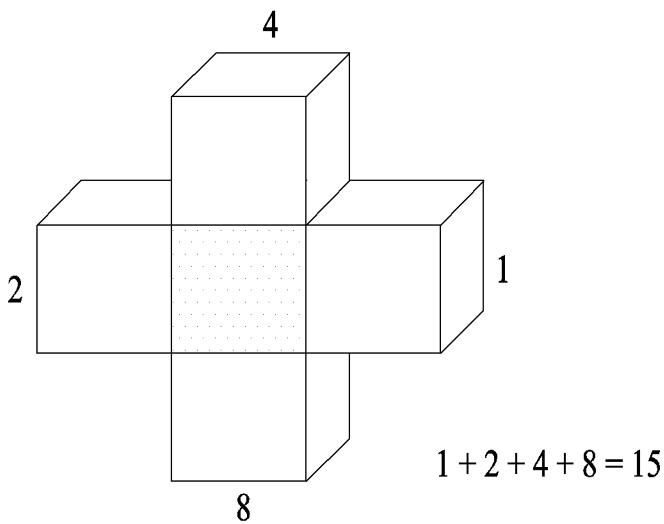

FIG. 16

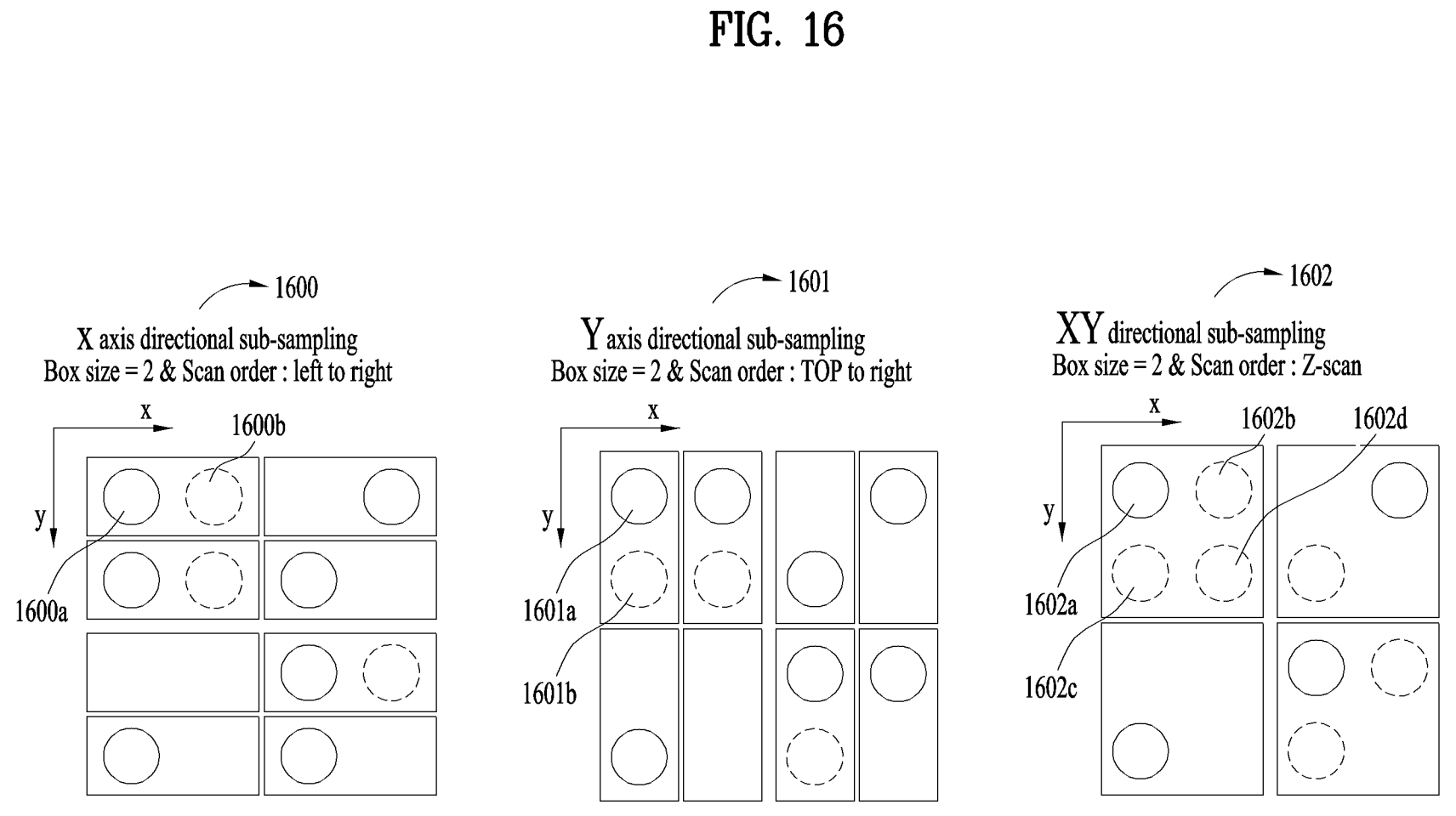

1600
X axis directional sub-sampling
Box size = 2 & Scan order : left to right
x
y
1600a
1600b 1601
Y axis directional sub-sampling
Box size = 2 & Scan order : TOP to right
x
y
1601a
1601b 1602
XY directional sub-sampling
Box size = 2 & Scan order : Z-scan
x
y
1602a
1602b
1602c
1602d 2000
2001
2002
2003
2004
2005
x
y
GBR
G
GR
GB
R
B

FIG. 23

| subsampling_info ( ) { | Descriptor |
|---|---|
| subsampling_info_id | ue(v) |
| if( subsampling_enable_flag ) { | |
| num_subsampled_sets | u(8) |
| for(i=0; i<num_subsampled_sets; i++) { | |
| subsampling_set_type[i] | u(4) |
| subsampling_grouping_method[i] | u(4) |
| if ( subsampling_grouping_method == 1 ) { | |
| subsampling_direction[i] | u(8) |
| subsampling_unit_size_x[i] | u(8) |
| subsampling_unit_size_y[i] | u(8) |
| subsampling_unit_size_z[i] | u(8) |
| subsampling_scan_order[i] | u(8) |
| subsampling_start_idx[i] | u(8) |
| } | |
| else if ( subsampling_grouping_method == 2 ) { | |
| subsampling_index_type[i] | u(8) |
| subsampling_rate[i] | u(8) |
| subsampling_offset[i] | u(8) |
| } | |
| else if( subsampling_grouping_method == 3) { | |
| subsampling_distance[i] | u(8) |
| } | |
| else if( subsampling_grouping_method == 4) { | |
| subsampling_lod_generation_method[i] | u(8) |
| subsampling_lod_num[i] | u(8) |
| } | |
| subsampling_reconstruction_method[i] | u(8) |
| num_neighbor_points[i] | u(8) |
| modeling_type[i] | u(8) |
| num_rec_coeff[i] | u(8) |
| for( j=0; j<num_rec_coeff[i]; j++ ) | |
| rec_coeff[i][j] | u(8) |
| } | |
| } | |
| } | |

FIG. 24

| seq_parameter_set( ) { | Descriptor |
|---|---|
| reserved_profile_compatibility_23bits<br>[Ed. assign bits from this when there is a profile defined] | u(23) |
| unique_point_positions_constraint_flag | u(1) |
| level_idc | u(8) |
| sps_bounding_box_present_flag | u(1) |
| if( sps_bounding_box_present_flag ) { | |
| sps_bounding_box_offset_x | se(v) |
| sps_bounding_box_offset_y | se(v) |
| sps_bounding_box_offset_z | se(v) |
| sps_bounding_box_scale_factor | ue(v) |
| sps_bounding_box_size_width | ue(v) |
| sps_bounding_box_size_height | ue(v) |
| sps_bounding_box_size_depth | ue(v) |
| } | |
| sps_source_scale_factor [Ed. TMC13 v7 uses float, but integer is preferred.] | u(32) |
| sps_seq_parameter_set_id | ue(v) |
| sps_num_attribute_sets | ue(v) |
| for( i = 0; i< sps_num_attribute_sets; i++ ) { | |
| attribute_dimension[ i ] | ue(v) |
| attribute_instance_id[ i ] | ue(v) |
| attribute_bitdepth[ i ] | ue(v) |
| attribute_cicp_colour_primaries[ i ] | ue(v) |
| attribute_cicp_transfer_characteristics[ i ] | ue(v) |
| attribute_cicp_matrix_coeffs[ i ] | ue(v) |
| attribute_cicp_video_full_range_flag[ i ] | u(1) |
| known_attribute_label_flag[ i ] | u(1) |
| if( known_attribute_label_flag[ i ] ) | |
| known_attribute_label[ i ] | ue(v) |
| else | |
| attribute_label_four_bytes[ i ] | u(32) |
| } | |
| log2_max_frame_idx | u(5) |
| axis_coding_order | u(3) |
| sps_bypass_stream_enabled_flag | u(1) |
| subsampling_enable_flag | u(1) |
| if( subsampling_enable_flag ) | |
| subsampling_info ( ) | |
| sps_extension_present_flag | u(1) |
| if( sps_extension_present_flag ) | |
| while( more_data_in_byte_stream( ) ) | |
| sps_extension_data_flag | u(1) |
| byte_alignment( ) | |
| } | |

FIG. 25

| geometry_parameter_set ( ) { | Descriptor |
|---|---|
| .... | |
| subsampling_enable_flag | u(1) |
| if( subsampling_enable_flag ) | |
| subsampling_info ( ) | |
| .... | |

FIG. 26

| attribute_parameter_set( ) { | Descriptor |
|---|---|
| .... | |
| subsampling_enable_flag | u(1) |
| if( subsampling_enable_flag ) | |
| subsampling_info ( ) | |
| .... | |

FIG. 27

| tile_inventory( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_size_width[ i ] | ue(v) |
| tile_bounding_box_size_height[ i ] | ue(v) |
| tile_bounding_box_size_depth[ i ] | ue(v) |
| subsampling_enable_flag | u(1) |
| if(subsampling_enable_flag) | |
| subsampling_info ( ) | |
| } | |
| byte_alignment( ) | |
| } | |

FIG. 28

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| if ( aps_slice_qp_delta_present_flag ) { | |
| ash_attr_qp_delta_luma | se(v) |
| ash_attr_qp_delta_chroma | se(v) |
| } | |
| ash_attr_layer_qp_delta_present_flag | u(1) |
| if ( ash_attr_layer_qp_delta_present_flag ) { | |
| numLayers = aps.attr_encoding = = 1 ? aps.raht_depth + 1 : aps. num_detail_levels + 1 | |
| for( i = 0; i < numLayers; i++ ){ | |
| ash_attr_layer_qp_delta_luma[i] | se(v) |
| ash_attr_layer_qp_delta_chroma[i] | se(v) |
| } | |
| } | |
| ash_attr_region_qp_delta_present_flag | u(1) |
| if ( ash_attr_region_qp_delta_present_flag ) { | |
| ash_attr_qp_region_box_origin_x | ue(v) |
| ash_attr_qp_region_box_origin_y | ue(v) |
| ash_attr_qp_region_box_origin_z | ue(v) |
| ash_attr_qp_region_box_width | ue(v) |
| ash_attr_qp_region_box_height | ue(v) |
| ash_attr_qp_region_box_depth | ue(v) |
| ash_attr_region_qp_delta | se(v) |
| } | |
| subsampling_enable_flag | u(1) |
| if( subsampling_enable_flag ) | |
| subsampling_info ( ) | |
| byte_alignment( ) | |
| } | |

FIG. 29

| geometry_slice_header( ) { | Descriptor |
|---|---|
| …. | |
| subsampling_enable_flag | u(1) |
| if( subsampling_enable_flag ) | |
| subsampling_info ( ) | |
| …. | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD BASED ON ATTRIBUTE DATA BASED ON SUBSAMPLED POINT

CROSS-REFERENCE TO PRIOR APPLICATIONS

This application is a National Stage of International Application No. PCT/KR2021/000329 filed on Jan. 11, 2021 and published on Jul. 10, 2021 as WO2021/201390A1, which claims priority to Korean Application No. 10-2020-0041193, filed on Apr. 3, 2020, the contents of which are all incorporated by reference herein in their entirety.

TECHNICAL FIELD

Embodiments provide a method for providing point cloud content to provide a user with various services such as virtual reality (VR), augmented reality (AR), mixed reality (MR), and autonomous driving services.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, as embodied and broadly described herein, a method for transmitting point cloud data may include encoding the point cloud data, and transmitting a bitstream containing the point cloud data.

In another aspect of the present disclosure, a method for receiving point cloud data may include receiving a bitstream containing the point cloud data, and decoding the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 3 illustrates an exemplary process of capturing a point cloud video according to embodiments;

FIG. 7 shows an example of a neighbor node pattern according to embodiments;

FIG. 16 illustrates an attribute subsampling method according to embodiments;

FIG. 23 illustrates a structure of signaling information about a subsampling scheme according to embodiments;

FIG. 24 illustrates a structure of a sequential parameter set (SPS) of point cloud data according to embodiments;

FIG. 25 illustrates a structure of a geometry parameter set (GPS) of point cloud data according to embodiments;

FIG. 26 illustrates a structure of an attribute parameter set (APS) of point cloud data according to embodiments;

FIG. 27 illustrates a structure of a tile parameter set (TPS) of point cloud data according to embodiments;

FIG. 28 illustrates a structure of an attribute slice header (ASH) of point cloud data according to embodiments;

FIG. 29 illustrates a structure of a geometry slice header (GSH) of point cloud data according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
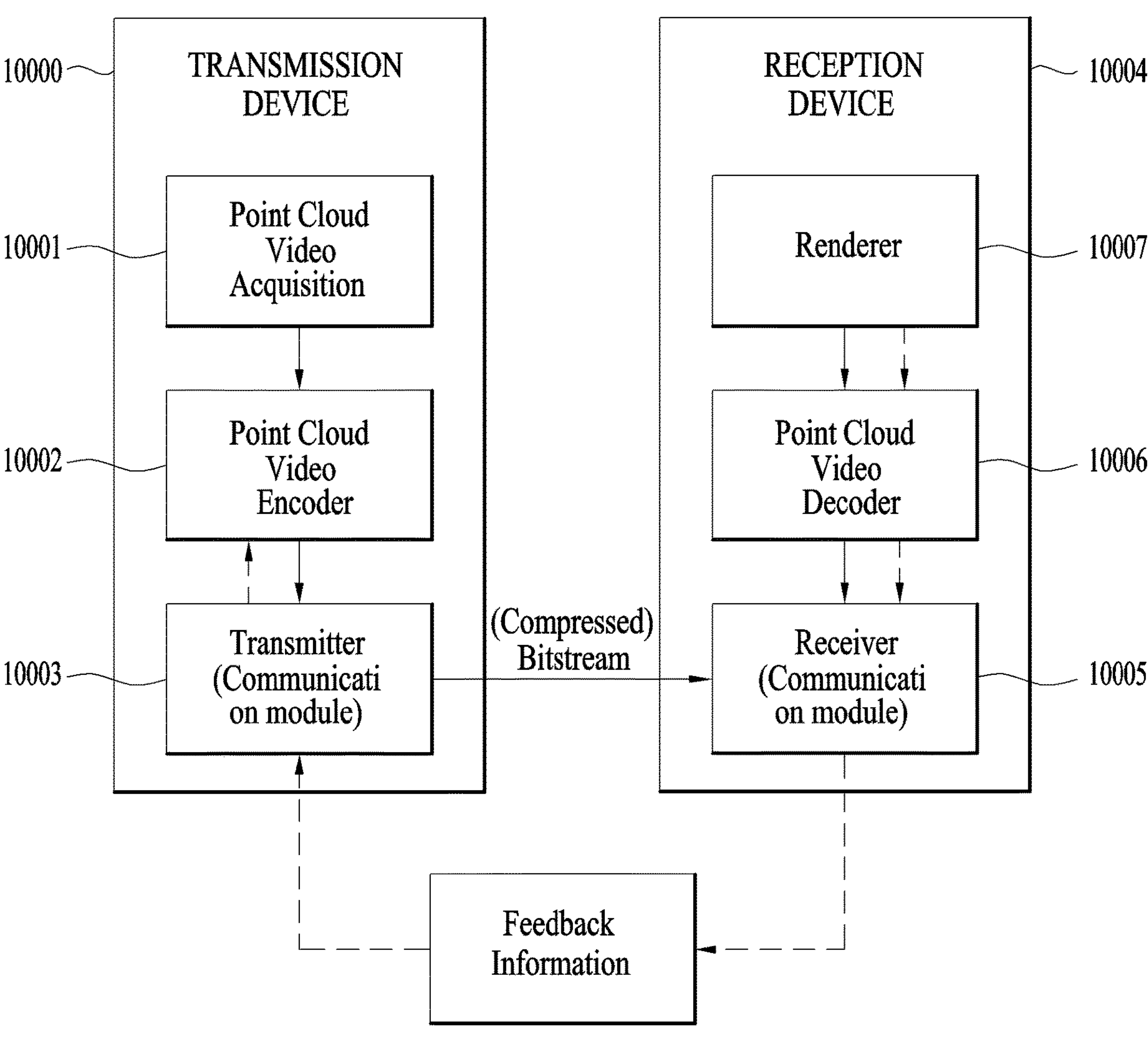
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
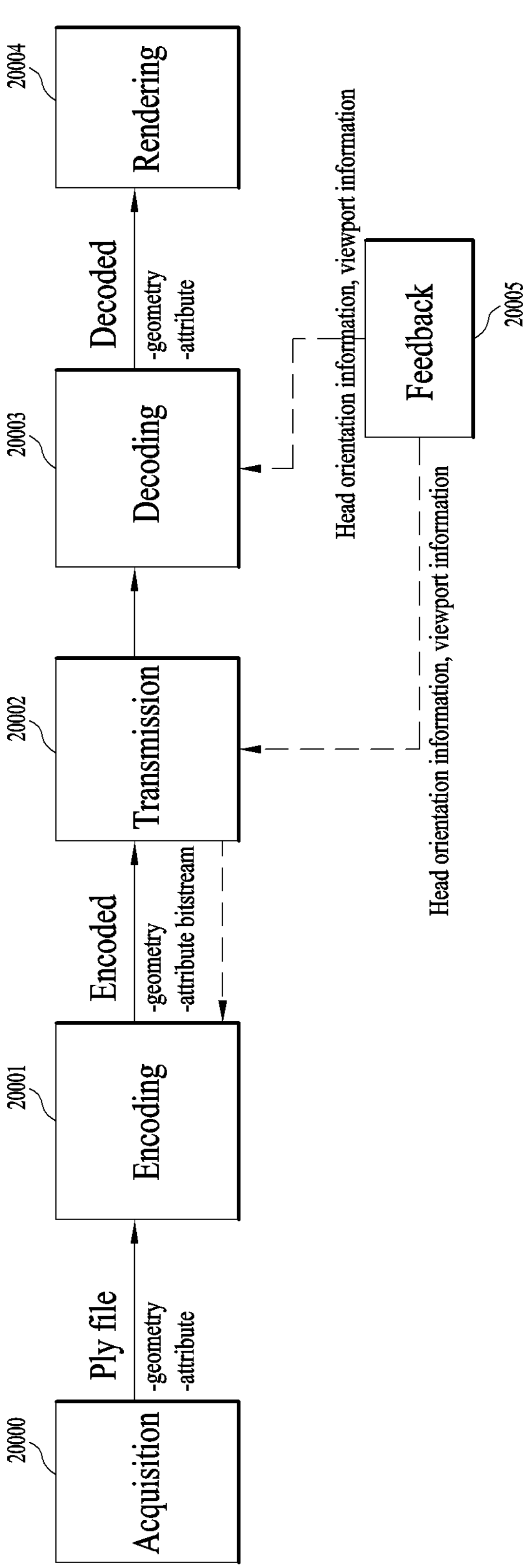
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
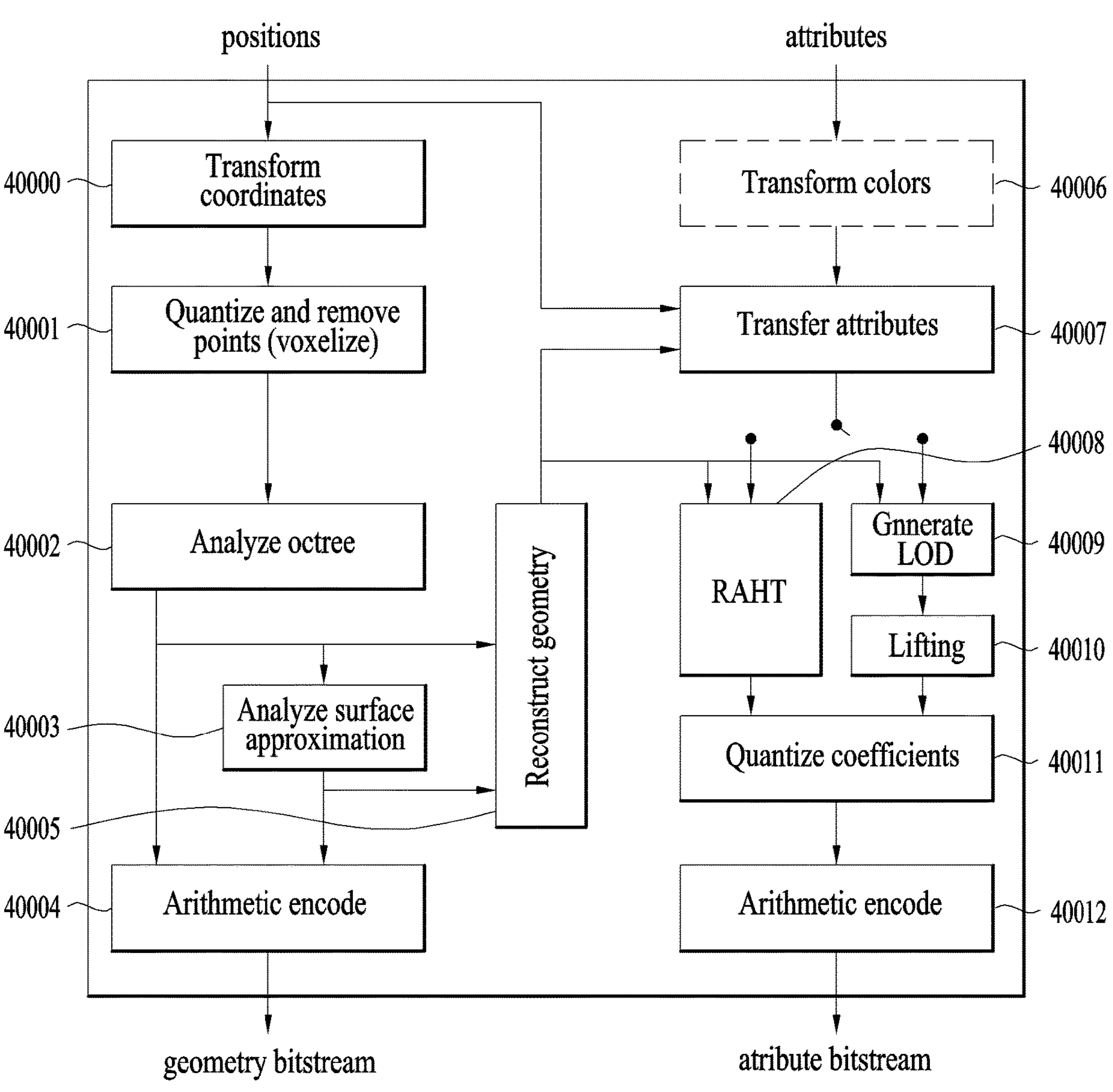
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
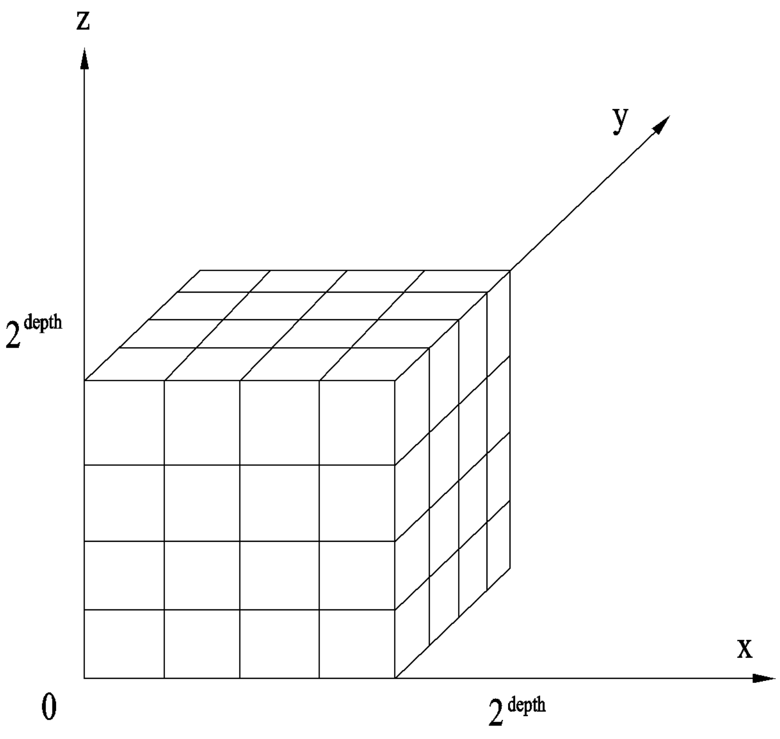
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/ video. The details of the voxel are the same as those described with reference to FIG. 4, and therefore a description thereof is omitted.

Figure 6:
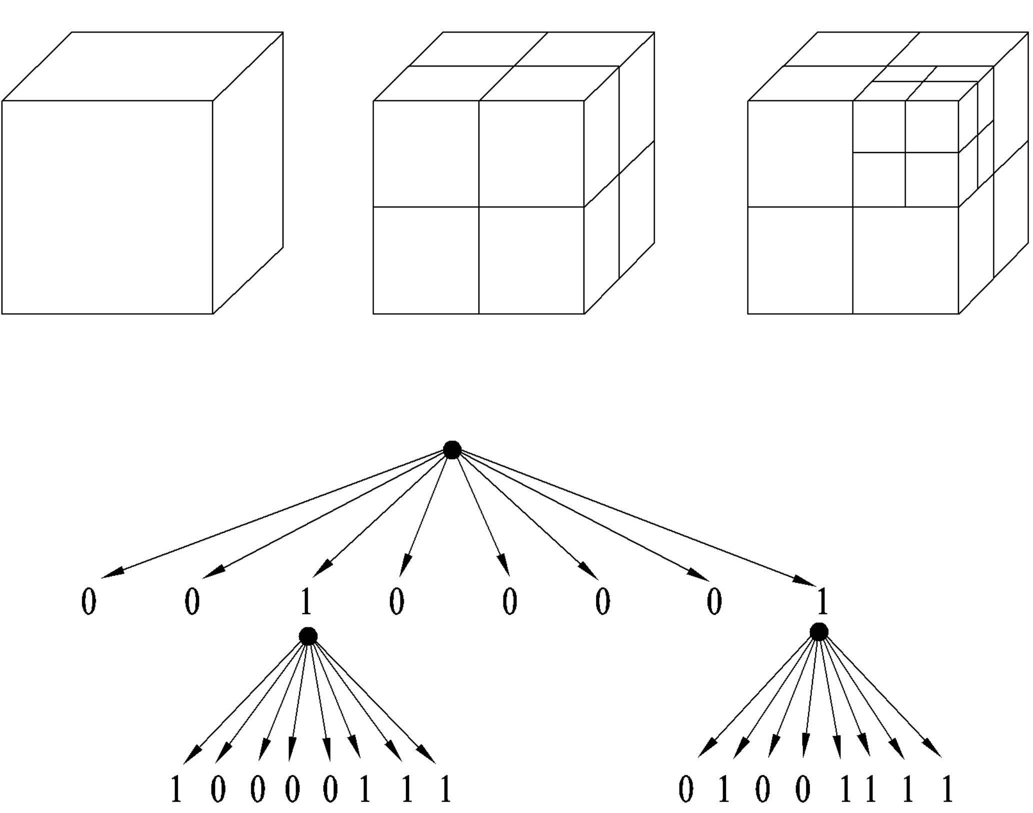
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$) Here, $2^d$ may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = \text{Ceil}\left(\text{Log}\,2\left(\text{Max}\left(x_n^{int}, y_n^{int}, z_n^{int}, n = 1, \ldots , N\right) + 1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$i)\begin{bmatrix}\mu_x\\ \mu_y\\ \mu_z\end{bmatrix}=\frac{1}{n}\sum_{i=1}^{n}\begin{bmatrix}x_i\\ y_i\\ z_i\end{bmatrix};\ ii)\begin{bmatrix}\overline{x}_i\\ \overline{y}_i\\ \overline{z}_i\end{bmatrix}=\begin{bmatrix}x_i\\ y_i\\ z_i\end{bmatrix}-\begin{bmatrix}\mu_x\\ \mu_y\\ \mu_z\end{bmatrix};\ iii)\begin{bmatrix}\sigma_x^2\\ \sigma_y^2\\ \sigma_z^2\end{bmatrix}=\sum_{i=1}^{n}\begin{bmatrix}\overline{x}_i^2\\ \overline{y}_i^2\\ \overline{z}_i^2\end{bmatrix}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE Triangles formed from vertices ordered 1, . . . , n

TABLE 1

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values). FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
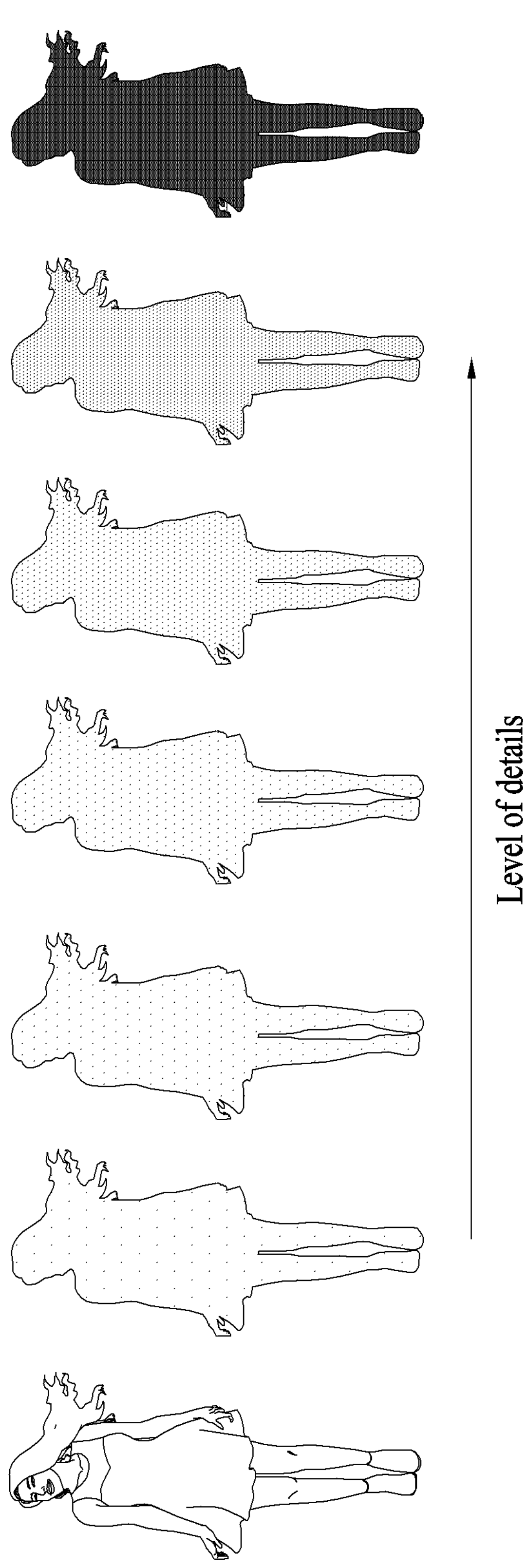
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
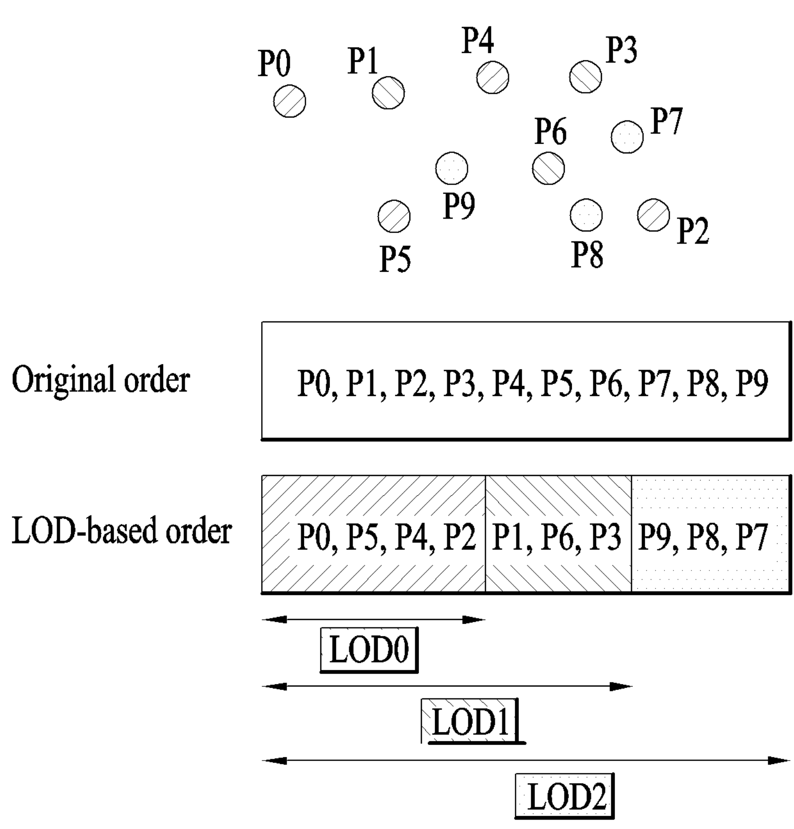
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

Attribute prediction residuals quantization pseudo code

TABLE 2

```
int PCCQuantization(int value, int quantStep) {
  if( value >=0) {
    return floor(value / quantStep + 1.0 / 3.0);
  } else {
    return −floor(−value / quantStep + 1.0 / 3.0);
  }
}
```

Attribute prediction residuals inverse quantization pseudo code

TABLE 3

```
int PCCInverseQuantization(int value, int quantStep) {
  if( quantStep ==0) {
    return value;
  } else {
    return value * quantStep;
  }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation. The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, \quad T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,0}}$, and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
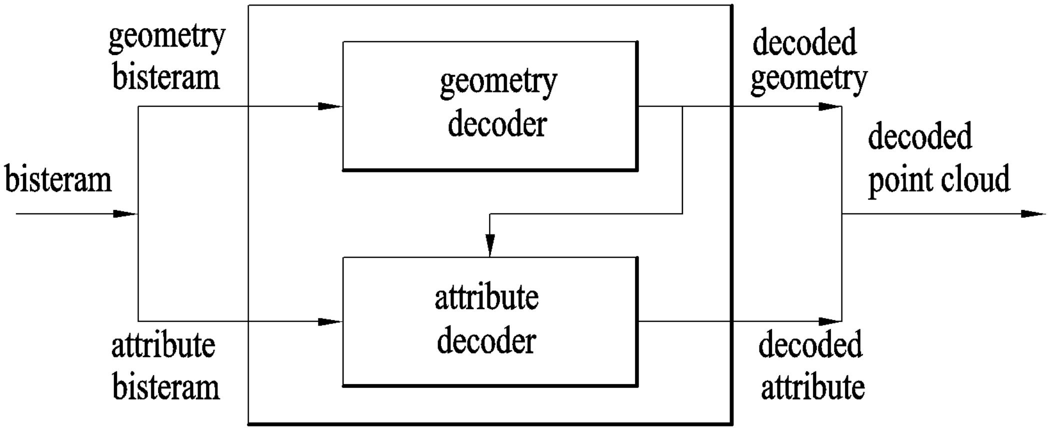
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
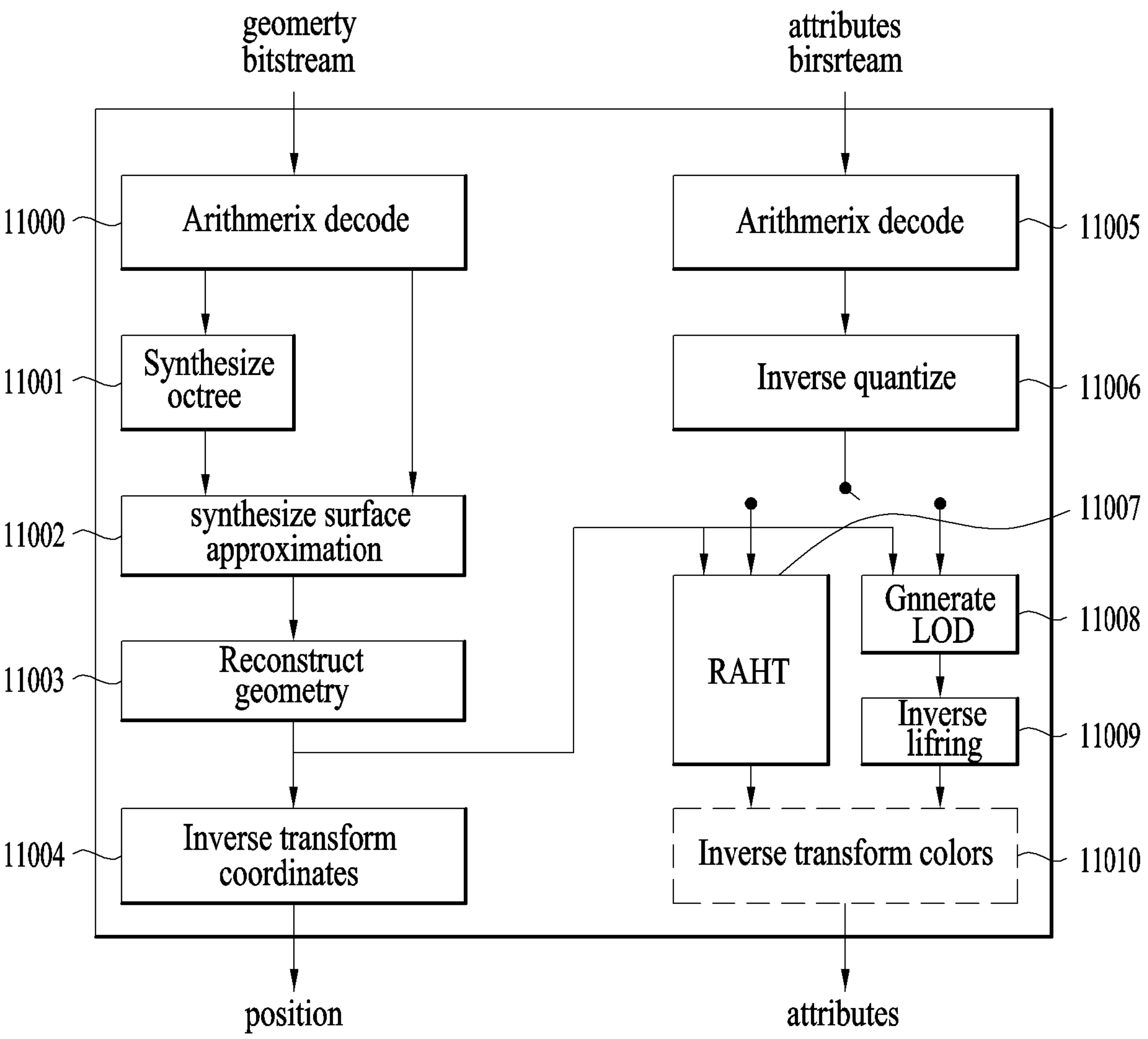
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
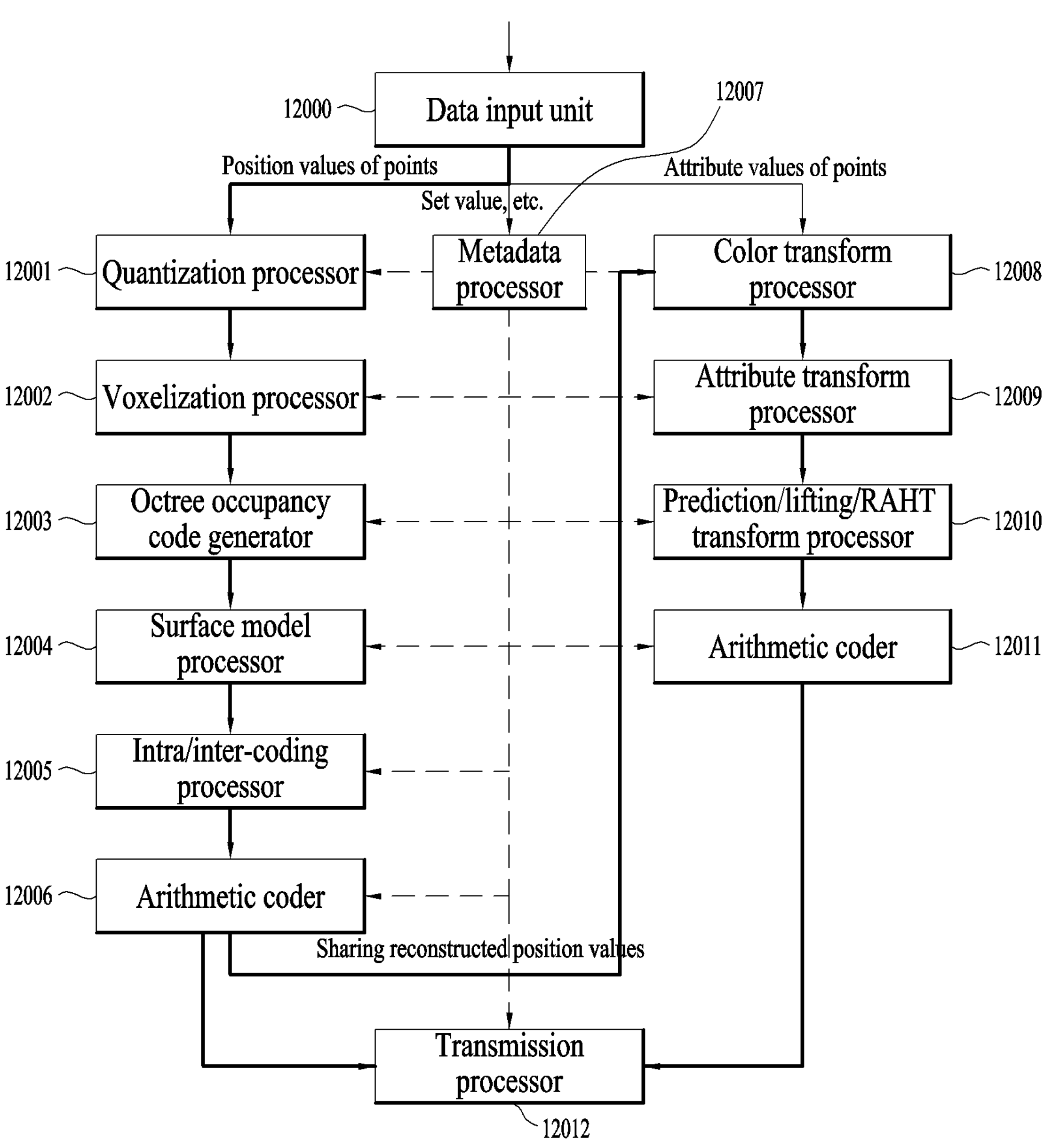
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom$0^{0}$ and one or more attribute bitstreams Attr$0^{0}$ and Attr$1^{0}$.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
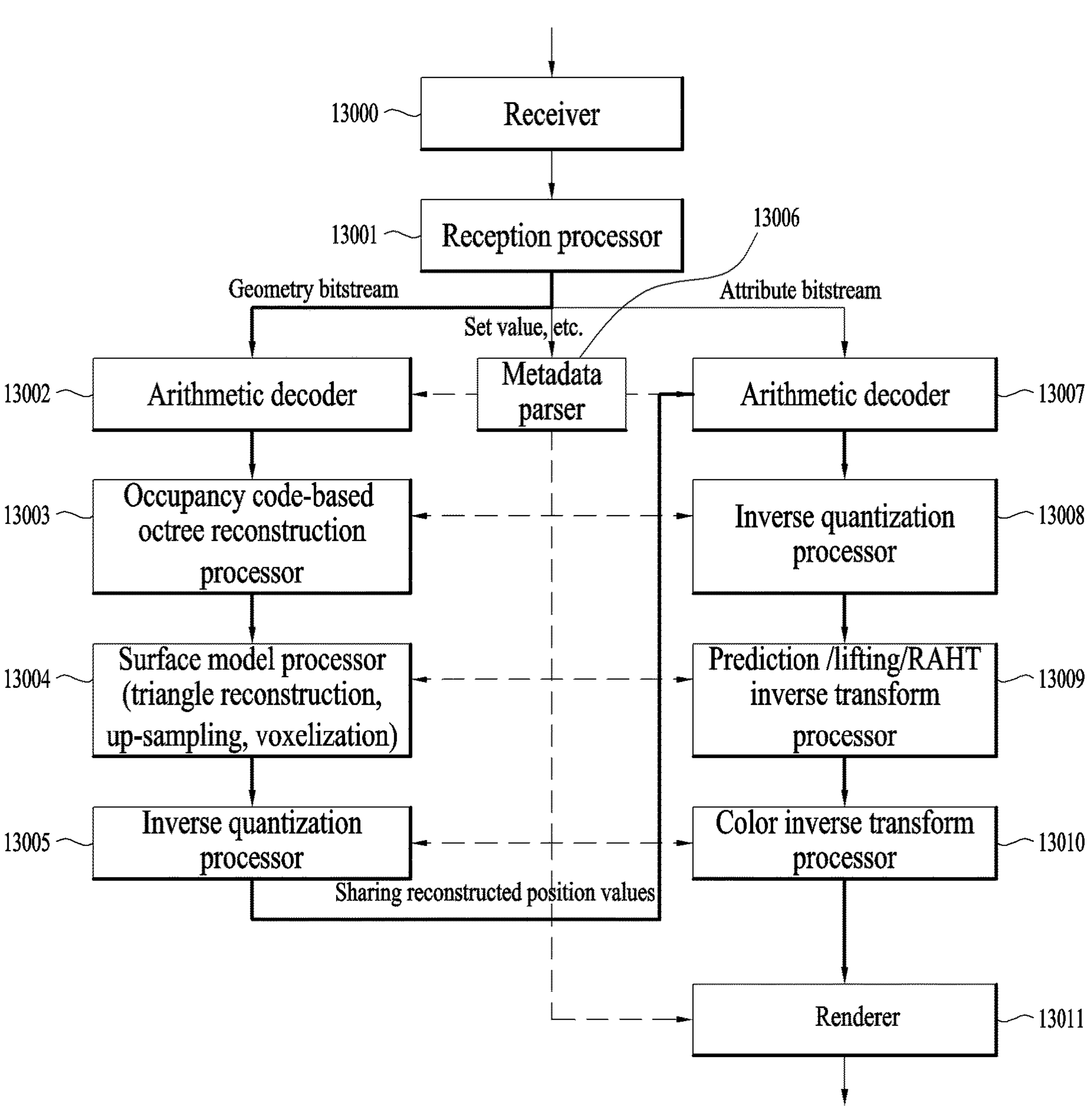
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
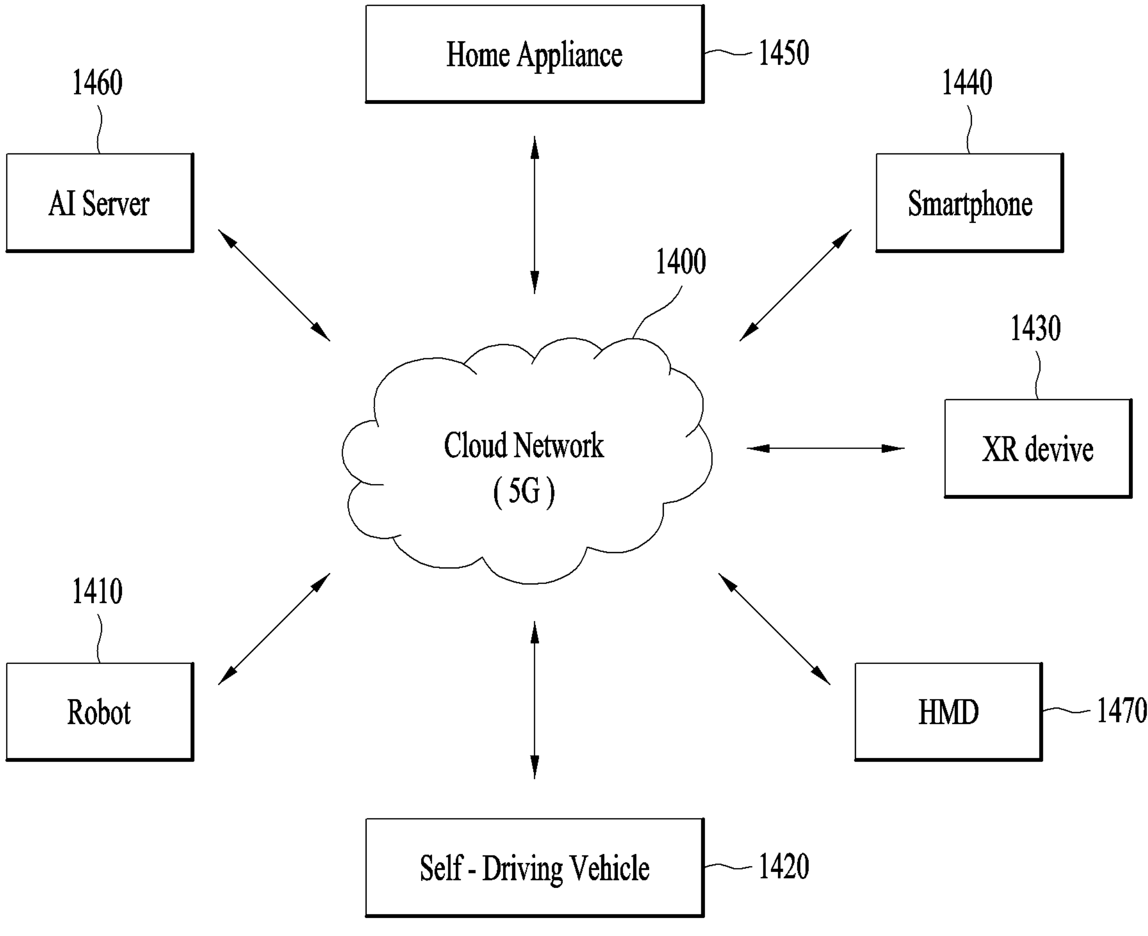
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
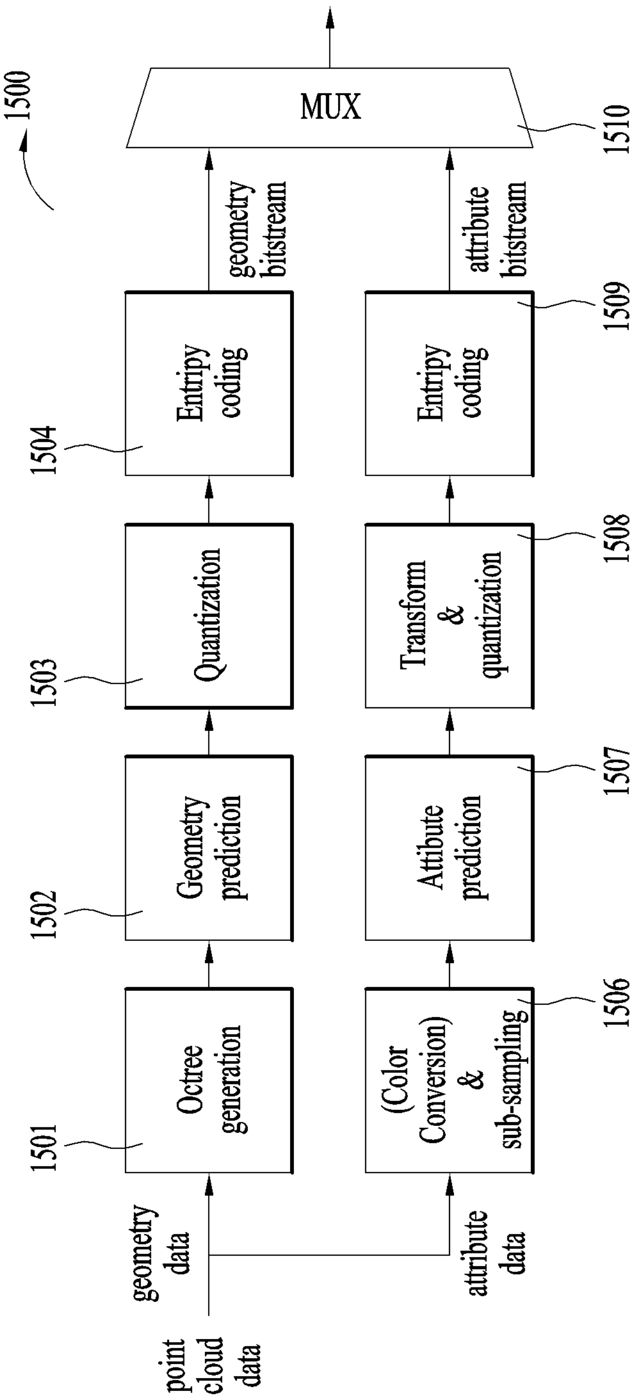
FIG. 15 is a block diagram illustrating a point cloud data transmission device according to embodiments.

FIG. 15 is a block diagram illustrating a point cloud data transmission device according to embodiments.

FIG. 15 is a block diagram illustrating a point cloud data transmission device (e.g., the point cloud data transmission device 10000 of FIG. 1, the point cloud video encoder 10002 of FIG. 1, the point cloud encoder of FIG. 4, the transmission device of FIG. 12, the encoder of FIG. 12, and the XR device 1430 of FIG. 14). The transmission device 1500 according to the embodiments may perform the same or similar operation to the encoding operation described with reference to FIGS. 1 to 14. The transmission device may include an octree generator (Octree generation) 1501, a geometry predictor (Geometry prediction) 1502, a quantizer (Quantization) 1503, an entropy coder (Entropy coding) 1504, a subsampler (Color Conversion) & sub-sampling) 1506, an attribute predictor (Attribute prediction) 1507, a transform/quantization unit (Transform & quantization) 1508, an entropy coder (Entropy coding) 1509, and/or a multiplexer (MUX) 1510. Although not shown in FIG. 15, the transmission device according to the embodiments may further include one or more elements configured to perform an operation that is the same as or similar to the encoding operation described with reference to FIGS. 1 to 14.

Point cloud (PCC) data or point cloud compression (PCC) data is input data to the point cloud transmission device 1500 and may include geometry and/or attributes. The geometry is information indicating a position (e.g., a location) of a point, and may be represented as parameters of coordinates such as orthogonal coordinates, cylindrical coordinates, or spherical coordinates. The attribute represents an attribute (e.g., color, transparency, reflectance, grayscale, etc.) of a point. The geometry may be referred to as geometry information (or geometry data), and the attribute may be referred to as attribute information (or attribute data).

The octree generator structures geometry information of input point cloud data for geometry coding into a structure such as an octree. The geometry information is structured based on at least one of an octree, a quadtree, a binary tree, a triple tree, or a k-d tree.

The geometry predictor according to the embodiments codes the structured geometry information.

The quantizer according to the embodiments may quantize the coded geometry information.

The entropy coder 1503 may entropy-code the quantized geometry information and output a geometry bitstream.

The octree generator, the geometry predictor, the quantizer, and the entropy coder 1503 perform the geometry coding (or geometry encoding) described with reference to FIGS. 1 to 14. The operations of the octree generator, the geometry predictor, the quantizer, and the entropy coder 1503 are the same as or similar to the operations of the coordinate transformer 40000, the quantizer 40001, the octree analyzer 40002, the surface approximation analyzer 40003, the arithmetic encoder 40004, and the geometry reconstructor (Reconstruct Geometry, 40005). Also, the operations of the octree generator, the geometry predictor, the quantizer, and the entropy coder 1503 are the same as or similar to the operations of the data input unit 12100, the quantization processor 12001, the voxelization processor 12002, the octree occupancy code generator 12003, the surface model processor 12004, the intra/inter-coding processor 12005, the arithmetic coder 12006, and the metadata processor 12007 described with reference to FIG. 12.

The distribution of points of the point cloud data may be based on the surrounding environment of the point cloud video acquirer (e.g., the acquirer of FIG. 1). For example, the points of the point cloud data acquired through LiDAR may be distributed more sparsely along the z-axis than along the x-axis and y-axis. That is, the points of the acquired point cloud data according to the surrounding environment of the acquirer may be unevenly distributed. Accordingly, the transmission device according to the embodiments encodes the point cloud data in consideration of the above-described uneven distribution of the points. For example, the transmission device performs geometry encoding based on the above-described octree structure (the octree described with reference to FIGS. 1 to 14) in consideration of the uneven distribution of the points, and performs attribute encoding based on the encoded geometry. Also, the transmission device according to the embodiments may asymmetrically compress (or encode) the geometry information and the attribute information. That is, the transmission device may selectively compress attribute information. The compressed attribute information may correspond to an attribute selected based on a subsampling scheme. Thus, compression efficiency may be increased by reducing the size of the bitstream compared to the case where all attribute information corresponding to the geometry information is compressed. The above-described operation of selectively compressing the attribute information and/or a process required to selectively compress the attribute information may be referred to as attribute subsampling, a subsampling scheme, or subsampling. That is, the transmission device according to the embodiments may compress some attributes instead of compressing all attributes of the points. Also, some attributes are not limited to all attributes The subsampler according to the embodiments may perform attribute subsampling (or subsampling process) based on a subsampling scheme. The subsampling scheme according to the embodiments may include a method (or a subsampling method) of subsampling attributes of one or more points. The transmission device according to the embodiments may perform attribute encoding (e.g., attribute encoding described with reference to FIGS. 1 to 14) only on the attributes of points subsampled by the subsampler. That is, the attributes to be encoded are reduced by the subsampling according to the embodiments compared to the case where the subsampling is not performed. Signaling information about the subsampling scheme including a subsampling method (or signaling information) may be carried in a bitstream to the reception device. The reception device according to the embodiments may identify the sub-sampled attribute based on the information about the subsampling method included in the above-described signaling information, and may perform an attribute reconstruction (or restoration) operation.

The subsampler according to the embodiments may perform color conversion coding for converting a color value included in the attribute information. The subsampler according to the embodiments may perform an operation that is the same as or similar to the operation of the color transform processor 12008 of FIG. 12.

The attribute predictor receives subsampled attribute information and performs attribute coding thereon.

The transform/quantization unit performs attribute transform and/or quantization on the attribute-coded attribute information.

The entropy coder 1506 entropy-codes the transformed and/or quantized attribute information and outputs an attribute bitstream.

The attribute predictor, the transform/quantization unit, and the entropy coder 1506 according to the embodiments perform attribute encoding (or attribute coding). The operations of the attribute predictor, the transform/quantization unit, and the entropy coder 1506 are the same as or similar to the operations of the geometry reconstructor 40005, the color transformer 40006, the attribute transformer 40007, and the RAHT transformer 40008, the LOD generator 40009, the lifting transformer 40010, the coefficient quantizer 40011, and/or the arithmetic encoder 40012 described with reference to FIG. 4. Also, the operations of the attribute predictor, the transform/quantization unit, and the entropy coder 1506 are the same as or similar to the operations of the color transform processor 12008, the attribute transform processor 12009, the prediction/lifting/RAHT transform processor 12110, and the arithmetic coder 12011 described with reference to FIG. 12.

The multiplexer according to the embodiments may transmit a geometry bitstream and/or an attribute bitstream, respectively, or may configure one bitstream from the geometry bitstream and/or the attribute bitstream and transmit the same. The operation of the multiplexer is the same as or similar to that of the transmission processor 12012 of FIG. 12.

The point cloud data transmission device according to the embodiments may transmit a bitstream in which a geometry bitstream and/or an attribute bitstream are multiplexed. Also, the bitstream according to the embodiments may further contain signaling information about the above-described subsampling scheme (or signaling information). The point cloud data transmission device according to the embodiments may encapsulate a bitstream and transmit the bitstream in the form of a segment and/or a file.

FIG. 16 illustrates an attribute subsampling method according to embodiments.

FIG. 16 illustrates an example of a method of performing the subsampling process described above with reference to FIG. 15. At least one element (e.g., the subsampler of FIG. 15) included in the transmission device according to the embodiments may perform the subsampling described with reference to FIG. 16. The transmission device (e.g., the subsampler of FIG. 15) according to the embodiments may perform a process of grouping points (or attributes) of point cloud data into one or more groups. The transmission device may perform a process of selecting at least one point (or attribute) from among the points (or attributes) included in each group. The transmission device may subsample the selected point (or attribute).

The subsampling according to the embodiments may be performed according to a method (or a first method) based on geometry of one or more points of point cloud data. The first method may be based on a subsampling unit, a subsampling direction, a subsampling scan order, and/or a subsampling order. The transmission device according to the embodiments may perform the above-described grouping process based on the subsampling unit and the subsampling direction. The transmission device according to the embodiments may perform the above-described selection process according to the subsampling scan order and/or the subsampling order. The transmission device according to the embodiments may subsample attributes of the selected points. The transmission device according to the embodiments may add information about the subsampling unit, the sub-sampling direction, the subsampling scan order, and/or the subsampling order to the signaling information described with reference to FIG. 15 and transmit the same to the reception device.

Parts 1600 to 1602 in FIG. 16 correspond to bird]s eye views of the xy plain viewed along the z-axis of a 3D coordinate system (e.g., a 3D coordinate system defined by the x-axis, y-axis, and z-axis described with reference to FIG. 2).

The subsampling unit according to the embodiments may represent a minimum spatial unit in a 3D space for subsampling. The subsampling unit according to the embodiments may correspond to a space corresponding to an integer multiple of a leaf node (e.g., the leaf node described with reference to FIG. 6). That is, the maximum number of points included in the subsampling unit is constant. For example, parts 1600 to 1602 represent cases where the subsampling unit represents a space corresponding to twice the leaf node.

The subsampling direction according to the embodiments may represent a direction in which the above-described subsampling unit is formed. That is, the subsampling direction may be defined when the above-described subsampling unit is two or more integer times of the leaf node. For example, part 1600 illustrates a case where the subsampling unit represents a space corresponding to twice the leaf node, and the subsampling direction is the x-axis. Part 1601 illustrates a case where the subsampling unit represents a space corresponding to twice the leaf node, and the subsampling direction is the y-axis. Part 1602 illustrates a case where the subsampling unit represents a space corresponding to twice the leaf node, and the subsampling directions are the x-axis and the y-axis. That is, the subsampling unit according to the embodiments may be defined based on the leaf node and the subsampling direction.

The subsampling scan order according to the embodiments may represent an order of scanning of points included in the subsampling unit within the subsampling unit. For example, the subsampling scan order may ascend the positive direction of the x-axis, the negative direction of the x-axis, the positive direction of the y-axis, the positive direction of the z-axis, the negative direction of the x-axis, left to right, right to left, or the Z-scan direction. For example, part 1600 illustrates scanning points in the positive direction of the x-axis within the subsampling unit. Part 1601 illustrates scanning points in the positive direction of the y-axis within the subsampling unit. Part 1602 illustrates scanning points in the z-scan direction within the subsampling unit.

The subsampling order according to the embodiments may represent an order of points to be subsampled among the points scanned according to the above-described subsampling scan order. That is, the value of the subsampling order may be less than or equal to a value indicating the number of points included in the subsampling unit. For example, parts 1600 to 1602 represent cases where the subsampling order indicates 1.

Part 1600 illustrates a case where the subsampling unit represents a space corresponding to twice the leaf node, the subsampling direction represents the x-axis, and the subsampling scan order represents the positive direction (or left to right direction) of the x-axis and the subsampling order indicates 1. That is, the transmission device (e.g., the subsampler 1506) may group points by forming a space corresponding to twice the leaf node in the positive direction of the x-axis. A group may include up to two points. According to embodiments, the transmission device may select a first scanned point 1600*a* by scanning points included in each group in the positive direction of the x-axis, and may not select the other point 1600*b*. That is, the transmission device may select the point 1600*a* having the smallest x-coordinate value indicating the point position from among the points included in each group. The transmission device according to the embodiments may subsample selected points and perform attribute encoding (e.g., the attribute encoding described with reference to FIG. 15) on the attribute of the subsampled points.

Part 1601 illustrates a case where the subsampling unit represents a space corresponding to twice the leaf node, the subsampling direction represents the y-axis, and the subsampling scan order represents the positive direction (or top to bottom direction) of the y-axis and the subsampling order indicates 1. That is, the transmission device (e.g., the subsampler 1506) may group points by forming a space corresponding to twice the leaf node in the positive direction of the y-axis. A group may include up to two points. According to embodiments, the transmission device may select a first scanned point 1601*a* by scanning points included in each group in the positive direction of the y-axis, and may not select the other point 1601*b*. That is, the transmission device may select the point 1601*a* having the smallest x-coordinate value indicating the point position from among the points included in each group. The transmission device according to the embodiments may subsample selected points and perform attribute encoding (e.g., the attribute encoding described with reference to FIG. 15) on the attribute of the subsampled points.

Part 1602 illustrates a case where the subsampling unit represents a space corresponding to twice the leaf node, the subsampling direction represents the x-axis and the y-axis, and the subsampling scan order represents the Z-scan direction of the y-axis and the subsampling order indicates 1. That is, the transmission device (e.g., the subsampler 1506) may group points by forming a space corresponding to twice the leaf node in the positive directions of the x-axis and the y-axis. Accordingly, a group may include up to 4 points. According to embodiments, the transmission device may select a first scanned point 1602*a* by Z-scanning points included in each group, and may not select the other points 1602*b*, 1602*c*, and 1602*d*. That is, the transmission device may select the point 1602*a* having the smallest x-coordinate and y-coordinate values indicating the point position from among the points included in each group. The transmission device according to the embodiments may subsample selected points and perform attribute encoding (e.g., the attribute encoding described with reference to FIG. 15) on the attribute of the subsampled points.

Figure 17:
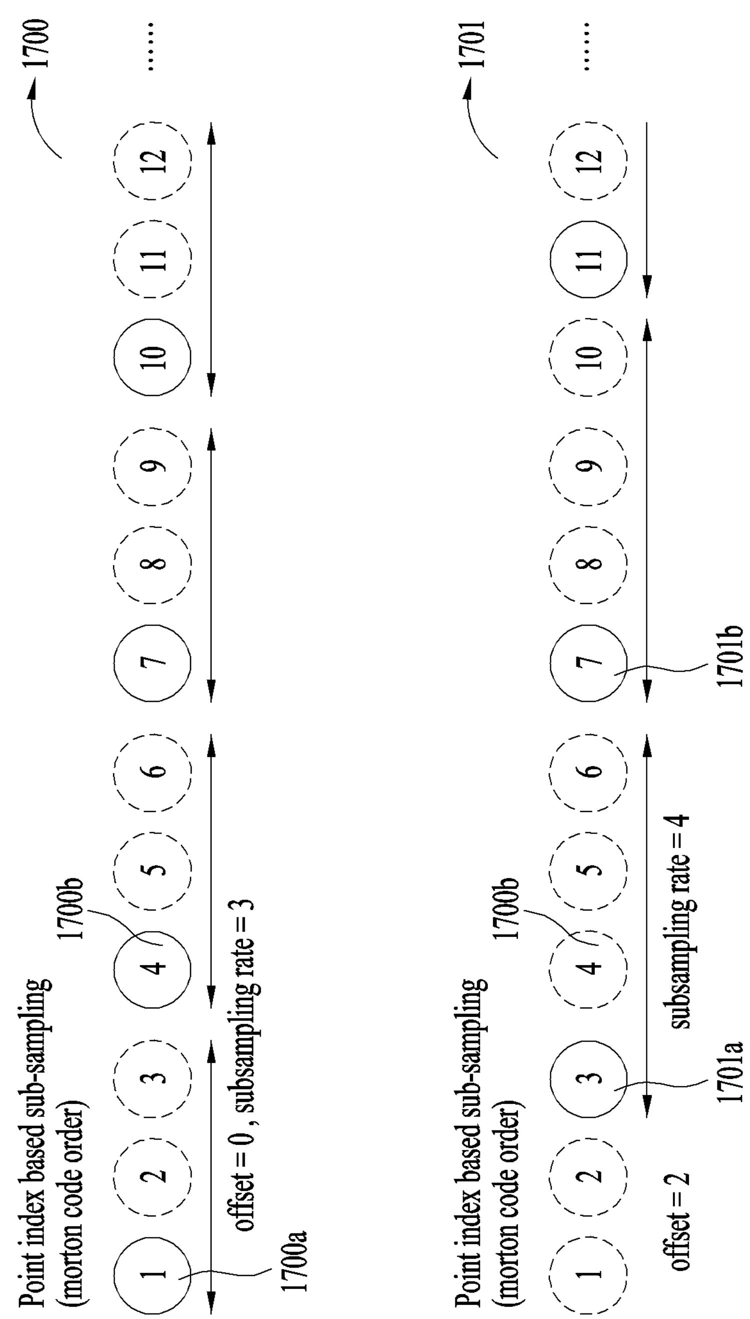
FIG. 17 illustrates an attribute subsampling method according to embodiments.

FIG. 17 illustrates an attribute subsampling method according to embodiments.

FIG. 17 illustrates an example of a method of performing the subsampling process described above with reference to FIG. 15. At least one element (e.g., the subsampler of FIG. 15) included in the transmission device according to the embodiments may perform the subsampling described with reference to FIG. 17. The transmission device (e.g., the subsampler of FIG. 15) according to the embodiments may perform a process of grouping points (or attributes) of point cloud data into one or more groups. The transmission device may perform a process of selecting at least one point (or attribute) from among the points (or attributes) included in each group. The transmission device may subsample the selected point (or attribute).

The subsampling according to the embodiments may be performed according to a method (or a second method) based on the order of reorganized one or more points of point cloud data. The points according to the embodiments may be reorganized based on the geometry of the points. The second method according to the embodiments may be based on reorganization of the points, a subsampling rate, and/or a subsampling offset. The transmission device according to the embodiments may perform the above-described grouping and selection according to the reorganization and subsampling rate and/or subsampling offset of points. The transmission device according to the embodiments may add information about the reorganization of the points, information about the subsampling rate, and/or information about the sub-sampling offset to the signaling information, and transmit the same to the reception device.

The reorganization of the points according to the embodiments represent reorganization the points in order based on the geometry of the points. For example, reorganization of the points may be based on the Morton code or the K-D tree (the Morton code or the K-D tree described with reference to FIG. 4) of the points. Parts 1700 and 1701 in FIG. 17 illustrate an example of reorganization of points based on the Morton code of the points. That is, the value of the Morton code of the points may increase from left to right in parts 1700 and 1701. The reorganized points are indexed in ascending order of the Morton code. That is, the indexes of the points increase from left to right in parts 1700 and 1701.

The subsampling rate according to the embodiments may represent a gap between reorganized points for subsampling. That is, the subsampling rate may represent an gap between indexes of points to be selected for sub-sampling. For example, part 1700 illustrates a case where the subsampling rate is 3. Accordingly, every three points may be grouped, and a point having the smallest index in each group may be selected for subsampling. Part 1702 illustrates a case where the subsampling rate is 4. Accordingly, every four points may be grouped, and a point having the smallest index in each group may be selected for subsampling.

The subsampling offset according to the embodiments may represent a position where subsampling starts. That is, the subsampling may be configured by setting the number of points indicated by the subsampling offset as an offset for subsampling. For example, part 1701 represents a case where the subsampling offset is 2. Accordingly, the first two points in ascending order of Morton code may be configured as an offset for subsampling. That is, subsampling may be started with a point corresponding to the third position in ascending order of the Morton code (or the third position in position order of indexes).

Part 1700 illustrates a case where points are reorganized based on the Morton code, the subsampling rate is 3, and the subsampling offset is 0. That is, the transmission device (e.g., the subsampler 1506) may reorganize the points in ascending order of the Morton code of the points to assign indexes, and group every three points in ascending order of the indexes. Each group includes three points. The transmission device according to the embodiments may select a point 1700*a*, 1700*b* having the smallest index (or Morton code) among the points included in each group. The transmission device may subsample the selected points and perform attribute encoding (e.g., the attribute encoding described with reference to FIG. 15) on the subsampled points.

Part 1701 illustrates a case where points are reorganized based on the Morton code, the subsampling rate is 5, and the subsampling offset is 2. That is, the transmission device (e.g., the subsampler 1506) may reorganize the points in ascending order of the Morton code of the points to assign indexes, and group every four points in ascending order of the indexes, except for the first two points in ascending order of the indexes (or Morton codes). Each group includes four points. The transmission device according to the embodiments may select a point 1701*a*, 1701*b* having the smallest index (or Morton code) among the points included in each group. The transmission device may subsample the selected points and perform attribute encoding (e.g., the attribute encoding described with reference to FIG. 15) on the subsampled points.

Figure 18:
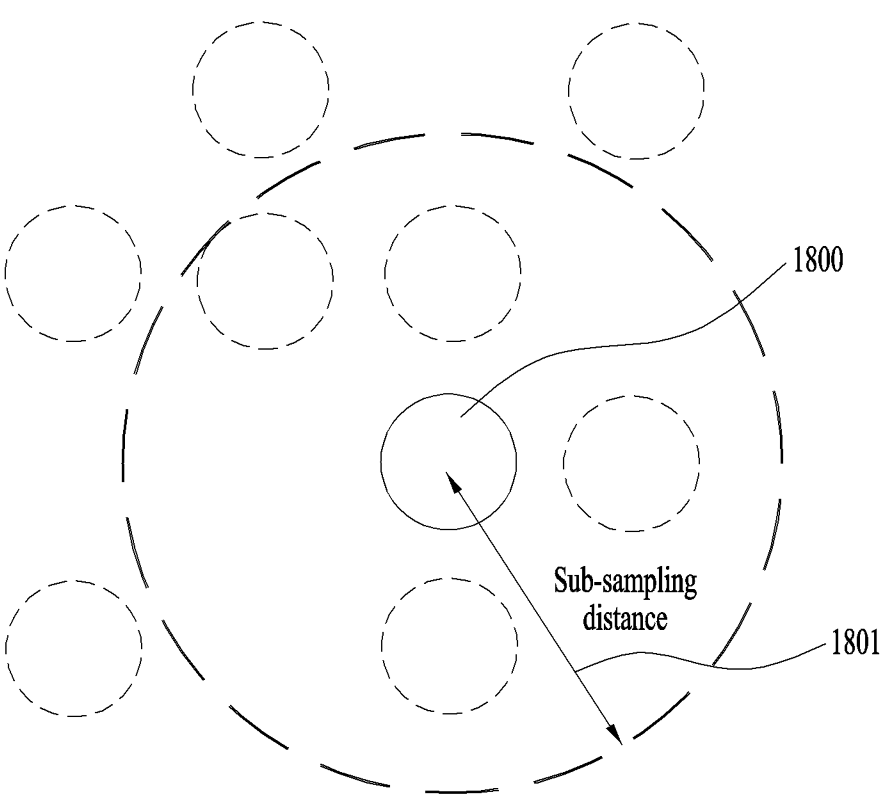
FIG. 18 illustrates an attribute subsampling method according to embodiments.

FIG. 18 illustrates an attribute subsampling method according to embodiments.

FIG. 18 illustrates an example of a method of performing the subsampling process described above with reference to FIG. 15. At least one element (e.g., the subsampler of FIG. 15) included in the transmission device according to the embodiments may perform the subsampling described with reference to FIG. 18. The transmission device (e.g., the subsampler of FIG. 15) according to the embodiments may perform a process of grouping points (or attributes) of point cloud data into one or more groups. The transmission device may perform a process of selecting at least one point (or attribute) from among the points (or attributes) included in each group. The transmission device may subsample the selected point (or attribute).

The subsampling according to the embodiments may be performed according to a method (or a third method) based on a representative point included in one or more points of the point cloud data and/or a subsampling distance. The third method according to the embodiments may be based on the representative point and/or the subsampling distance. The transmission device according to the embodiments may perform the above-described grouping and selection according to the representative point and/or subsampling distance. The transmission device according to the embodiments may add information about the representative point and/or information about the subsampling distance described above in the signaling information described with reference to FIG. 15 and transmit the same to the reception device.

The representative point according to the embodiments may be selected from among one or more points. The representative points may be selected at regular intervals (or distances). The representative point may correspond to a subsampled point. The subsampling distance according to the embodiments may be used to form a predetermined range (or space) based on the representative point. For example, the transmission device may form a spherical space having a value represented by the subsampling distance from the representative point as a radius.

1800 represents the representative point according to the embodiments. 1801 represents the subsampling distance according to the embodiments. The transmission device according to the embodiments may group points by forming a spherical space having a value indicated by the subsampling distance 1801 from the representative point 1800 as a radius thereof. Each group according to the embodiments includes at least one point. The spherical spaces corresponding to the grouped groups may or may not overlap each other. The transmission device according to the embodiments may select a representative point from among the points included in the spherical space corresponding to each group and may not select the points other than the representative point. The transmission device may subsample selected points and perform attribute encoding (e.g., the attribute encoding described with reference to FIG. 15) on the attribute of the subsampled points.

Figure 19:
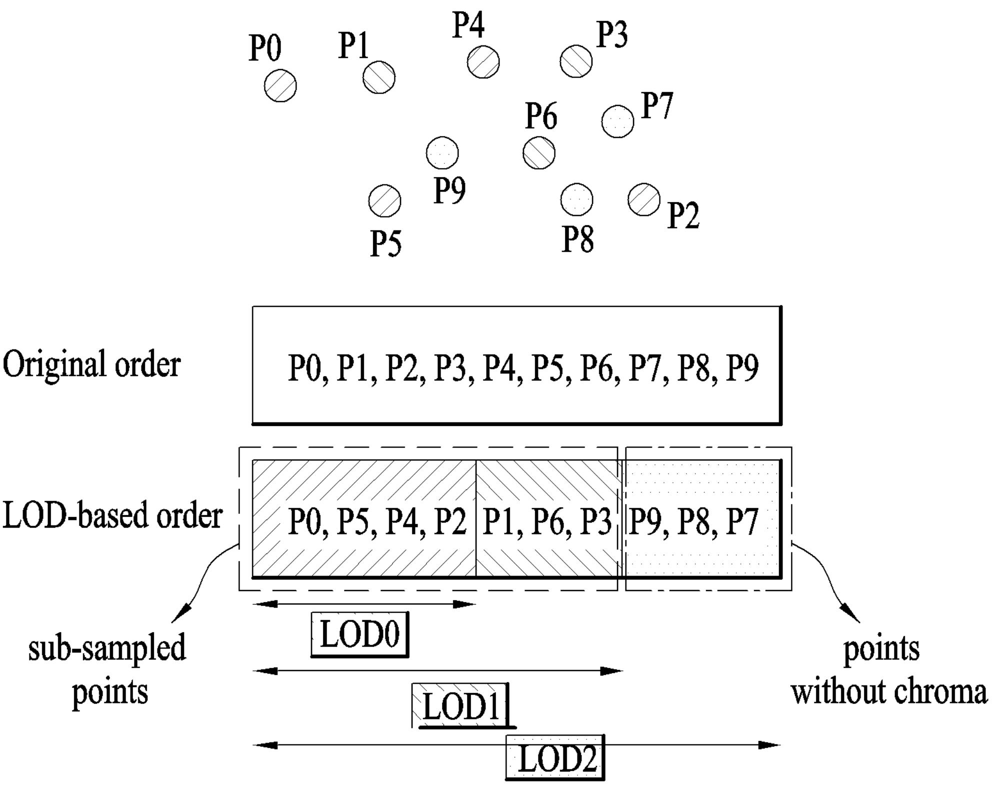
FIG. 19 illustrates an attribute subsampling method according to embodiments.

FIG. 19 illustrates an attribute subsampling method according to embodiments.

FIG. 19 illustrates an example of a method of performing the subsampling process described above with reference to FIG. 15. At least one element (e.g., the subsampler of FIG. 15) included in the transmission device according to the embodiments may perform the subsampling described with reference to FIG. 19. The transmission device (e.g., the subsampler of FIG. 15) according to the embodiments may perform a process of grouping points (or attributes) of point cloud data into one or more groups. The transmission device may perform a process of selecting at least one point (or attribute) from among the points (or attributes) included in each group. The transmission device may subsample the selected point (or attribute).

The subsampling according to the embodiments may be performed according to a method (or a fourth method) based on a level of detail (LOD) generated by reorganization one or more points of the point cloud data. The LOD according to the embodiments corresponds to the LOD described above with reference to FIGS. 4 and 8 to 15. The fourth method according to the embodiments may be carried out based on an LOD generation method and/or a subsampled LOD. The transmission device according to the embodiments may perform the above-described grouping and selection based on the LOD generation method and/or the subsampled LOD. The transmission device according to the embodiments may add information about the LOD generation method and/or information about the subsampled LOD in the signaling information described with reference to FIG. 15 and transmit the same to the reception device.

The LOD generation method according to the embodiments represents the method of generating the LOD described above. As described above with reference to FIG. 9, the LOD may be generated by reorganizing the points into a set of refinement levels. For example, the LOD may be generated based on the Euclidean distance between points. The LOD may be generated based on an octree structure (the octree described with reference to FIGS. 1 to 15) according to the geometry of the points. The LOD may be generated based on a Morton code order (the Morton codes described with reference to FIGS. 1 to 15) of the points. The method of generating an LOD by the transmission device according to the embodiments is not limited to the above-described example.

An LOD to be subsampled according to embodiments may represent an LOD including points selected for subsampling. That is, the transmission device according to the embodiments may select and subsample points included in the LOD to be subsampled. For example, when the LOD to be subsampled represents LOD 0 and LOD 1, the transmission device may select points included in LOD 0 and LOD 1 for subsampling, and may not select points included in LODs other than LOD 0 and LOD 1. That is, the LOD selected by the LOD to be subsampled may have a smaller LOD value (or LOD level) that the LODs not selected.

Accordingly, the transmission device according to the embodiments may group points by generating an LOD according to the LOD generation method. Each group of the grouped groups may correspond to one LOD. The transmission device may select points for subsampling according to the LOD to be subsampled. That is, the transmission device may select points included in the LOD to be subsampled for subsampling. The transmission device may subsample the selected points and perform attribute encoding (e.g., the attribute encoding described with reference to FIG. 15) on the subsampled points.

Figure 20:
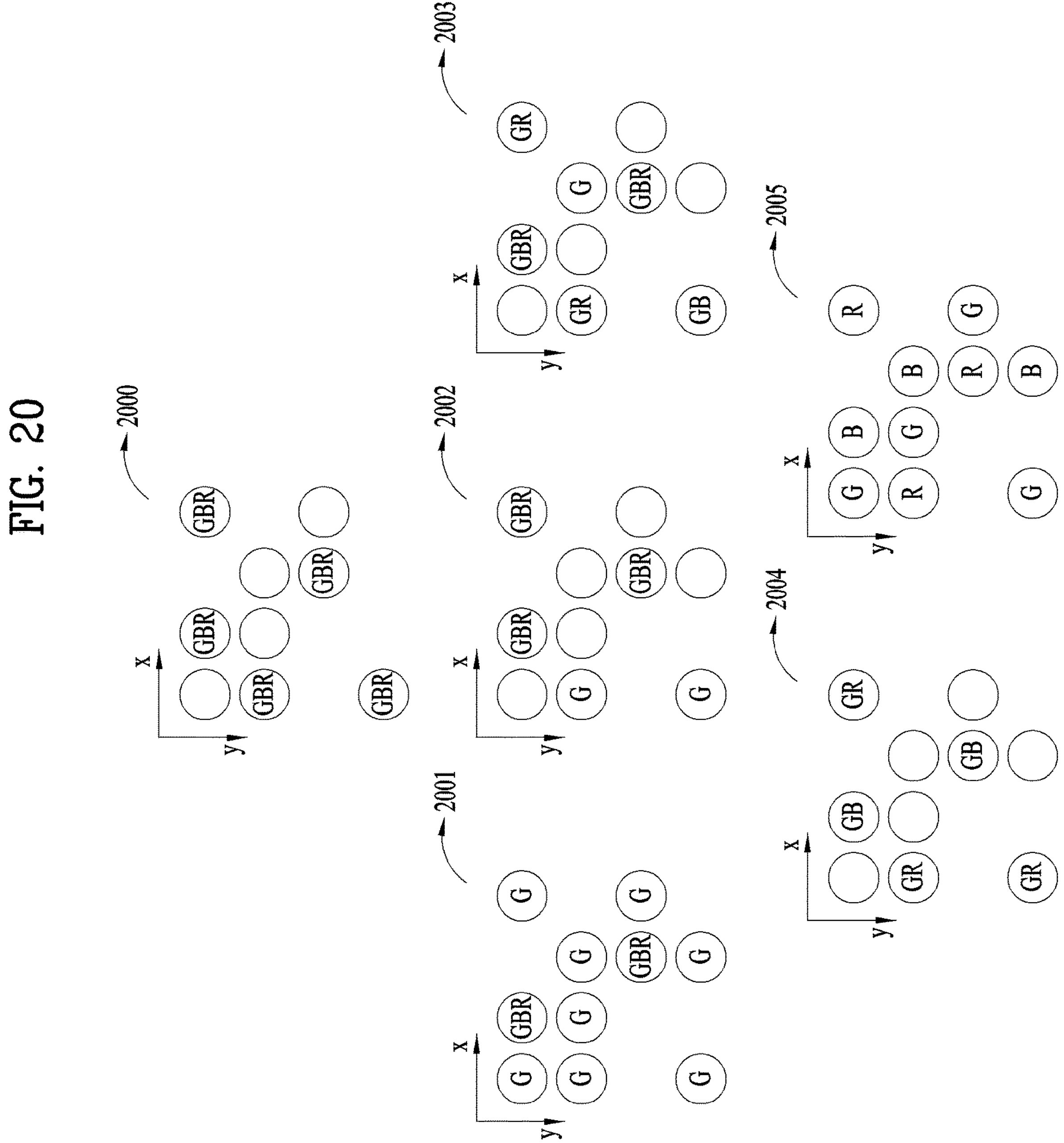
FIG. 20 illustrates an attribute subsampling method according to embodiments.

FIG. 20 illustrates an example of an attribute subsampling method according to embodiments.

FIG. 20 illustrates an example of a method of performing the subsampling process described above with reference to FIGS. 15 to 19. At least one element (e.g., the subsampler of FIG. 15) included in the transmission device according to the embodiments may perform the subsampling described with reference to FIG. 20.

As described above with reference to FIG. 15, the transmission device according to the embodiments may perform subsampling on the attribute of points. As described above with reference to FIG. 2, the attribute of the points may represent one or more attributes, wherein each of the attributes may represent at least one of texture information, color information, reflectance information, or transparency information. Also, each attribute may include one or more channels (or components). For example, an attribute representing YCbCr color information include Y channel (luminance component), Cb channel (chrominance component), and/or Cr channel (chrominance component). Also, an attribute representing RGB color information includes an R channel, a G channel, and/or a B channel. The transmission device according to the embodiments may perform subsampling on the basis of each attribute and/or each channel described above. The transmission device may perform subsampling according to a different subsampling method (e.g., the first to fourth methods described with reference to FIGS. 16 to 19) for each attribute and/or each channel. For example, the transmission device may perform subsampling only on the attribute indicating reflectance information about the points. Alternatively, the transmission device may perform subsampling on the R channel according to the first method and subsampling on the G channel according to the second method, and skip subsampling for the B channel among the attributes representing the RGB color information about the points.

FIG. 20 illustrates a method of performing subsampling on at least one of an R channel, a G channel, and a B channel among the attributes representing RGB color information about points.

Part 2000 illustrates a case where subsampling is performed on the R channel, the G channel, and the B channel according to the same subsampling method (e.g., the first to fourth methods described above with reference to FIGS. 16 to 19). That is, the attribute of the subsampled points in part 2000 may include all of the R channel, the G channel, and the B channel.

Point cloud data according to embodiments may have a non-uniform attribute distribution. For example, the R channel and the G channel of the point cloud data may be relatively sparsely distributed compared to the B channel. When subsampling according to the same subsampling method is applied to the R channel, G channel, and B channel of the point cloud data, the attribute may be more distorted than when subsampling is applied to the R channel, G channel, and B channel according to different subsampling methods. Accordingly, the transmission device may set the subsampling frequency for the R channel and the G channel to be lower than the subsampling frequency for the B channel for the point cloud data described above. The subsampling frequency according to the embodiments may represent the frequency at which subsampling is performed on the attribute or channel. The subsampling frequency according to the embodiments may be determined according to the subsampling unit, the subsampling direction, the subsampling scan order, and the subsampling order in FIG. 16, the reorganization of points, the subsampling rate and the subsampling offset in FIG. 17, the representative point and the subsampling distance in FIG. 18, and the LOD generation method and the LOD to be subsampled in FIG. 19.

Part 2001 illustrates a case where subsampling according to the same subsampling method is performed only on the R channel and the B channel among the R channel, the G channel, and the B channel, and subsampling is not performed on the G channel. That is, the attribute of the subsampled points in part 2001 may include all of the R channel, the G channel, and the B channel, or may include only the G channel.

Parts 2002 and 2004 illustrate cases where the subsampling method applied to the G channel is different from the subsampling method applied to the R channel and the B channel among the R channel, G channel, and B channel. That is, the subsampling frequency for the G channel may be different from the subsampling frequency for the R channel and the B channel. For example, the subsampling order in the first method for the G channel may be different from the subsampling order in the first method for the R channel and the B channel. Accordingly, the attribute of the subsampled points in part 2002 may include all of the R channel, the G channel, and the B channel, may include only the R channel and the G channel (not shown in part 2002), may include only the R channel and the B channel (not shown in part 2002), may include only the G channel, or may not include any of the R channel, the G channel, and the B channel.

Parts 2003 and 2005 cases where different subsampling methods are applied to the R channel, the G channel, and the B channel, respectively. That is, different subsampling frequencies may be used for the R channel, the G channel, and the B channel, respectively. For example, the subsampling orders in the first method may be used for the R channel, the G channel, and the B channel, respectively. Accordingly, the attribute of the subsampled points in part 2003 may include all of the R channel, the G channel, and the B channel, may include only the R channel and the G channel or only the R channel and the B channel (not shown in 2003), may include only the B channel and the G channel, or may include only one of the R channel, the G channel, and the B channel, or may not include any of the R channel, the G channel, and the B channel.

As described in the drawings, the transmission device according to the embodiments may apply subsampling according to different subsampling methods for each attribute and/or each channel according to attribute characteristics of the point cloud data. That is, the transmission device may perform the above-described grouping, selection, and subsampling in FIGS. 16 to 19 for each attribute and/or each channel according to the attribute characteristics of the point cloud data.

Figure 21:
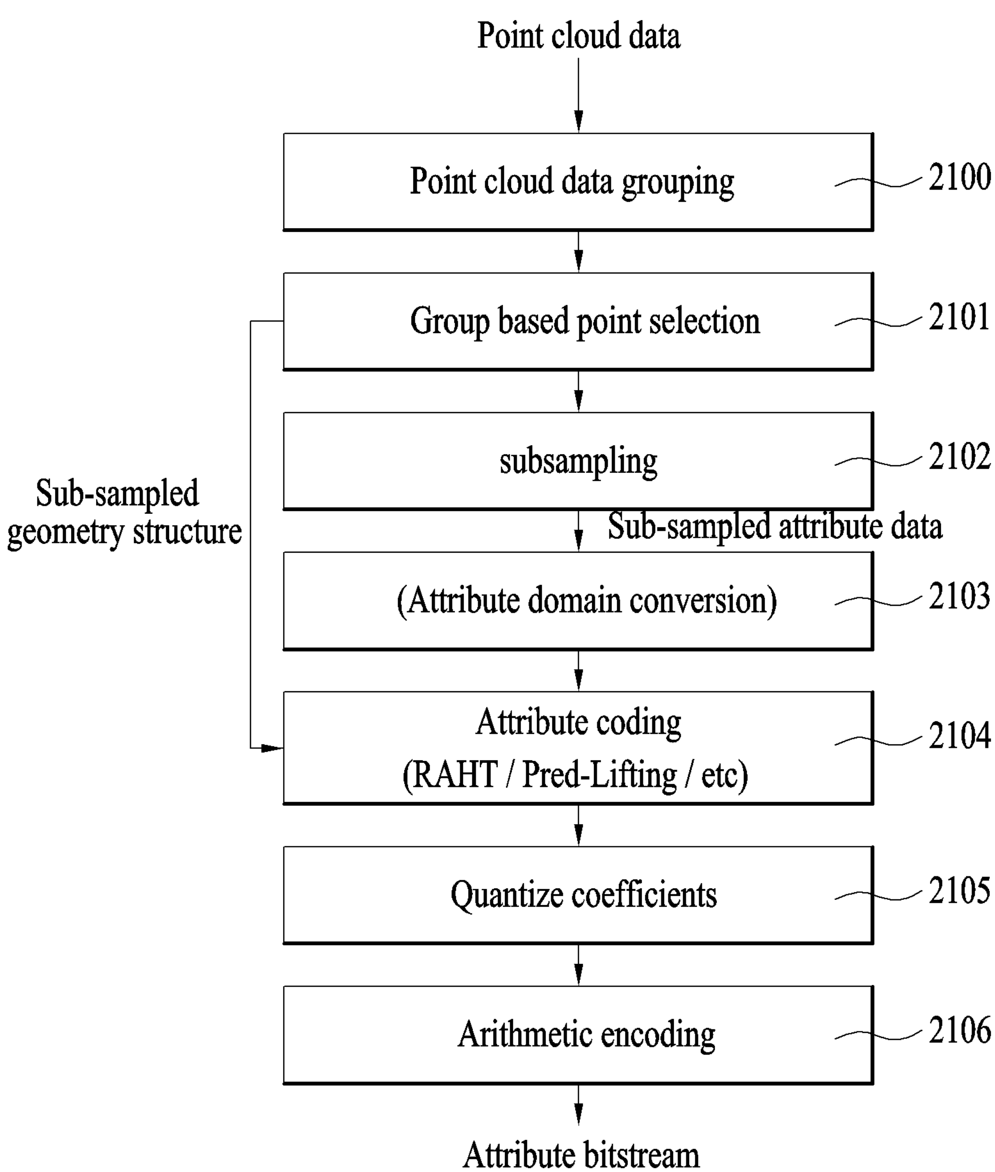
FIG. 21 illustrates an exemplary flowchart of a point cloud data transmission method according to embodiments.

FIG. 21 illustrates an exemplary flowchart of a point cloud data transmission method according to embodiments.

FIG. 21 illustrates a method of transmitting point cloud data by a transmission device (e.g., the point cloud video encoder 10002 of FIG. 1, the point cloud encoder of FIG. 4, the point cloud encoder described with reference to FIG. 12, the point cloud data transmission device 1500 described with reference to FIG. 15, etc.). The flowchart of the point cloud data transmission method according to the embodiments may include point cloud data grouping 2100, grouping based point selection 2101, subsampling 2102, attribute conversion 2103, attribute coding 2104, quantization 2105, and/or arithmetic encoding 2106. The transmission device according to the embodiments may further include one or more operations to carry out the point cloud data transmission method.

The point cloud data grouping 2100 according to the embodiments may include receiving input point cloud data and grouping points. The grouping according to the embodiments is the same as or similar to the grouping described with reference to FIGS. 16 to 20.

The grouping based point selection 2101 according to the embodiments selecting at least one point from among points included in each grouped group according to a subsampling method (the subsampling method described with reference to FIGS. 16 to 20). The grouping based point selection according to the embodiments is the same as or similar to the selection of points described with reference to FIGS. 16 to 20.

The subsampling 2102 according to the embodiments includes an operation required to perform attribute encoding on an attribute of points selected based on a subsampling scheme. The attribute selected based on the subsampling scheme according to the embodiments may correspond to some attributes described above with reference to FIG. 15. The subsampling according to the embodiments is the same as or similar to the subsampling described with reference to FIGS. 15 to 20.

The attribute conversion 2103 according to the embodiments includes converting the attribute based on the reconstructed geometry. The attribute conversion according to the embodiments is the same as or similar to the operation of the attribute transformer 40007 described with reference to FIG. 4.

The attribute coding 2104 according to the embodiments includes performing attribute encoding based on one of RAHT coding, predictive conversion coding, or lifting conversion coding. The attribute coding according to the embodiments is the same as or similar to the operations of RAHT coding, prediction conversion coding, and lifting conversion coding described above with reference to FIG. 4.

The quantization 2105 according to the embodiments includes quantizing the attribute-encoded point cloud data. The quantization according to the embodiments is the same as or similar to the operation of the quantizer 40011 of FIG. 4.

The arithmetic encoding 2106 according to the embodiments may include performing entropy encoding on the quantized point cloud data. The arithmetic encoding according to the embodiments is the same as or similar to the operation of the arithmetic encoder 40004 of FIG. 4.

The transmission device according to the embodiments may transmit a bitstream (e.g., the bitstream described with reference to FIGS. 1 to 20) to the reception device according to the point cloud data transmission method described with reference to FIG. 21. The bitstream may include a geometry bitstream, an attribute bitstream, and/or signaling information about the subsampling scheme described with reference to FIGS. 15 to 20.

Figure 22:
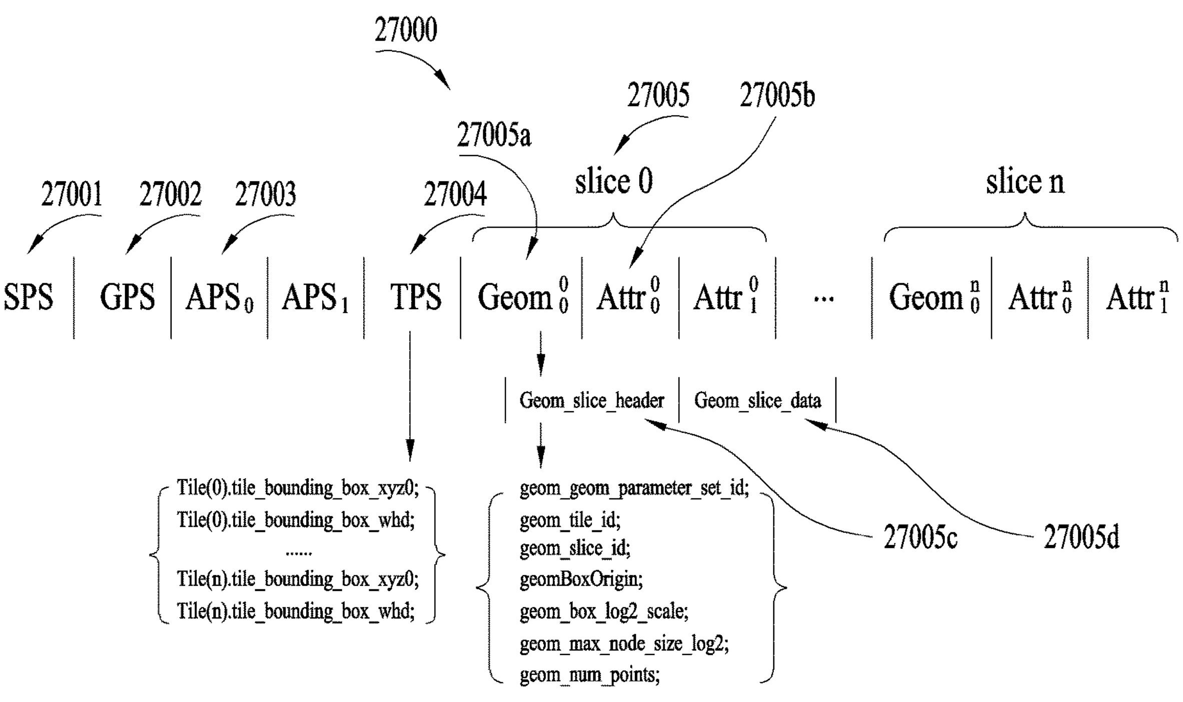
FIG. 22 illustrates a structure of a bitstream according to embodiments.

FIG. 22 illustrates a structure of a bitstream according to embodiments.

The point cloud processing device (for example, the transmission device described with reference to FIGS. 1, 12, and 14) may transmit the encoded point cloud data in the form of a bitstream. The bitstream is a sequence of bits that form a representation of point cloud data (or a point cloud frame).

The point cloud data (or point cloud frame) may be partitioned into tiles and slices.

The point cloud data may be partitioned into multiple slices, and is encoded in a bitstream. One slice is a set of points and is expressed as a series of syntax elements representing all or part of the encoded point cloud data. One slice may or may not have dependencies on other slices. In addition, one slice includes one geometry data unit, and may have one or more attribute data units or may have zero attribute data unit. As described above, since attribute encoding is performed based on geometry encoding, the attribute data units are based on geometry data units in the same slice. That is, the point cloud data reception device (for example, the reception device 10004 or the point cloud video decoder 10006) may process attribute data based on the decoded geometry data. Accordingly, in a slice, a geometry data unit must appear before the associated attribute data units. The data units in the slice are necessarily contiguous, and the order of the slices is not specified.

A tile is a (three-dimensional) rectangular parallelepiped in a bounding box (for example, the bounding box described with reference to FIG. 5). The bounding box may include one or more tiles. One tile may fully or partially overlap another tile. One tile may include one or more slices.

Accordingly, the point cloud data transmission device may provide high-quality point cloud content by processing data corresponding to a tile according to the importance. That is, the point cloud data transmission device according to the embodiments may perform point cloud compression coding of data corresponding to an area important to a user with better compression efficiency and appropriate latency.

A bitstream according to embodiments contains signaling information and a plurality of slices (slice 0, . . . , slice n). As shown in the figure, signaling information precedes slices in the bitstream. Accordingly, the point cloud data reception device may first obtain the signaling information and sequentially or selectively process a plurality of slices based on the signaling information. As shown in the figure, slice0 includes one geometry data unit Geom00 and two attribute data units Attr00 and Attr10. Also, the geometry data unit appears before the attribute data unit in the same slice. Accordingly, the point cloud data reception device processes (decodes) the geometry data unit (or geometry data), and then processes the attribute data unit (or attribute data) based on the processed geometry data. The signaling information according to the embodiments may be referred to as signaling data, metadata, or the like, but is not limited thereto.

According to embodiments, the signaling information includes a sequence parameter set (SPS), a geometry parameter set (GPS), and one or more attribute parameter sets (APSs). The SPS is encoding information about the entire sequence, such as a profile or a level, and may include comprehensive information (sequence level) about the entire sequence, such as a picture resolution and a video format. The GPS is information about geometry encoding applied to geometry included in the sequence (bitstream). The GPS may include information about an octree (e.g., the octree described with reference to FIG. 6) and information about an octree depth. The APS is information about attribute encoding applied to an attribute included in the sequence (bitstream). As shown in the figure, the bitstream contains one or more APSs (e.g., APS0, APS1 . . . in the figure) according to an identifier for identifying an attribute.

According to embodiments, the signaling information may further include a TPS. The TPS may include a tile identifier, information about a tile size, and the like as information about the tile. According to embodiments, the signaling information is applied to a corresponding bitstream as information about a sequence, that is, a bitstream level. In addition, the signaling information has a syntax structure including a syntax element and a descriptor describing the same. A pseudo code for describing the syntax may be used. In addition, the point cloud reception device may sequentially parse and process syntax elements appearing in the syntax.

Although not shown in the figure, the geometry data unit and the attribute data unit include a geometry header and an attribute header, respectively. The geometry header and the attribute header are signaling information applied at a corresponding slice level and have the above-described syntax structure.

The geometry header includes information (or signaling information) for processing a corresponding geometry data unit. Therefore, the geometry header appears first in the geometry data unit. The point cloud reception device may process the geometry data unit by first parsing the geometry header. The geometry header has an association with the GPS, which contains information about the entire geometry. Accordingly, the geometry header contains information specifying gps_geom_parameter_set_id included in the GPS. In addition, the geometry header contains tile information (e.g., tile_id) related to a slice to which the geometry data unit belongs, and a slice identifier.

The attribute header contains information (or signaling information) for processing a corresponding attribute data unit. Accordingly, the attribute header appears first in the attribute data unit. The point cloud reception device may process the attribute data unit by first parsing the attribute header. The attribute header has an association with the APS, which contains information about all attributes. Accordingly, the attribute header contains information specifying aps_attr_parameter_set_id included in the APS. As described above, attribute decoding is based on geometry decoding. Accordingly, the attribute header contains information specifying a slice identifier contained in the geometry header in order to determine a geometry data unit associated with the attribute data unit.

FIG. 23 illustrates a structure of signaling information about a subsampling scheme according to embodiments.

A bitstream of point cloud data according to the embodiments may include signaling information about the subsampling scheme of FIG. 23 (e.g., signaling information about the subsampling scheme described with reference to FIGS. 15 to 21). The point cloud data receiver according to the embodiments may identify some attributes selected based on the subsampling scheme from among all attributes of the point cloud data based on the signaling information about the subsampling scheme of FIG. 23.

subsampling_info_id (subsampling ID information) may specify an identifier for identifying signaling information about a subsampling scheme.

num_subsampled_sets (subsampling number information) may indicate the number of attribute types to which subsampling is applied. For example, when color information and reflectance information among the attributes of point cloud data are subsampled, num_subsampled_sets may indicate 2. The number indicated by num_subsampled_sets may less than or equal to the number of all attribute types of the point cloud data.

The signaling information described with reference to FIG. 22 may further include the following information identified by i. The value indicated by the identifier i may be greater than or equal to 0 and less than the value indicated by num_subsampled_sets.

subsampling_set_type (subsampling type information) may specify an identifier for an attribute type to which subsampling is applied. For example, subsampling_set_type equal to 0 indicates that the geometry of points is subsampled. The method of subsampling the geometry of points is the same as or similar to the method of subsampling the attribute described above with reference to FIGS. 15 to 22. subsampling_set_type equal to 1 indicates that the attribute of points is subsampled. subsampling_set_type equal to 2 indicates that an attribute representing color information is subsampled. subsampling_set_type equal to 3 indicates that an attribute representing reflectance information is subsampled. subsampling_set_type equal to 4 indicates that an attribute representing material information is subsampled. subsampling_set_type equal to 5 indicates that the R channel of the attribute representing the color information is subsampled. subsampling_set_type equal to 6 indicates that the G channel of the attribute representing the color information is subsampled. subsampling_set_type equal to 7 indicates that the B channel of the attribute representing the color information is subsampled.

subsampling_grouping_method (information about the subsampling method) specifies information about the subsampling method described with reference to FIGS. 16 to 21. subsampling_grouping_method indicates a method for performing subsampling. For example, subsampling_grouping_method equal to 0 indicates that subsampling is not performed. subsampling_grouping_method equal to 1 (or information about the first method) indicates that subsampling is performed according to the first method described above with reference to FIG. 16. subsampling_grouping_method equal to 2 (or information about the second method), indicates that subsampling is performed according to the second method described above with reference to FIG. 17. subsampling_grouping_method equal to 3 (or information about the third method) indicates that subsampling is performed according to the third method described above with reference to FIG. 18. subsampling_grouping_method equal to 4 (or information about the fourth method) indicates that subsampling is performed according to the fourth method described above with reference to FIG. 19.

When subsampling_grouping_method indicates information (or 1) about the first method, the signaling information of FIG. 23 may further include the following information.

subsampling_direction (information about the subsampling direction) may indicate a subsampling direction (the subsampling direction of FIG. 16). For example, subsampling_direction equal to 0 indicates the x-axis. subsampling_direction equal to 1 indicates the y-axis. subsampling_direction equal to 2 indicates the z-axis. subsampling_direction equal to 3 indicates the x-axis and y-axis. subsampling_direction equal to 4 indicates the y-axis and z-axis. subsampling_direction equal to 5 indicates the x-axis and z-axis. subsampling_direction equal to 6 indicates the x-axis, y-axis and z-axis.

subsampling_unit_size (information about the subsampling unit, not shown in this figure) may specify information about the subsampling unit described above with reference to FIG. 16. The size of the space corresponding to the subsampling unit may be determined based on a value indicated by subsampling_unit_size. For example, a subsampling unit having subsampling_unit_size equal to 2 has a space corresponding to twice that of a leaf node. As described above with reference to FIG. 16, the subsampling unit may be determined according to subsampling_unit_size and subsampling_direction.

The subsampling unit according to the embodiments may be determined by the following information in place of subsampling_unit_size and subsampling_direction described above.

subsampling_unit_size_x (subsampling unit x-axis information), subsampling_unit_size_y (subsampling unit y-axis information), and subsampling_unit_size_z (subsampling unit z-axis information) specify information about the subsampling unit described above with reference to FIG. 16. subsampling_unit_size_x specifies information about an integer multiple of the leaf node along the x-axis. subsampling_unit_size_y specifies information about an integer multiple of the leaf node along the y-axis. subsampling_unit_size_z specifies information about an integer multiple of the leaf node along the z-axis. For example, when subsampling_unit_size_x is 2, subsampling_unit_size_y is 4, and subsampling_unit_size_z is 8, the subsampling unit may correspond to a space determined by a space corresponding to two leaf nodes along the x-axis, and a space corresponding to four leaf nodes along the y-axis, a space corresponding to eight leaf nodes along the z-axis.

subsampling_scan_order (information about the subsampling scan order) indicates the subsampling scan order described above with reference to FIG. 16. subsampling_scan_order may indicate a positive or negative direction of the x-axis, the y-axis, or the z-axis, a Z-scan direction, or the like.

subsampling_start_idx (information about the subsampling order) indicates the subsampling order described above with reference to FIG. 16. That is, subsampling_start_idx may indicate the order of subsampling target points in the subsampling unit. For example, subsampling_start_idx equal to 3 indicates that the attribute of the third scanned point among points scanned according to the subsampling scan order in the subsampling unit is subsampled.

When subsampling_grouping_method indicates information (or 2) about the second method, the signaling information of FIG. 23 may further include the following information.

subsampling_index_type (information about reorganzation of points) indicates the method of reorganzing the points described above with reference to FIG. 17. For example, subsampling_index_type may indicate that points are reorganzed based on a Morton code.

subsampling_rate (information about the subsampling rate) indicates the subsampling rate described above with reference to FIG. 17. For example, subsampling_rate may have an integer value greater than or equal to 2 and less than or equal to 255.

subsampling_offset (information about the subsampling offset) indicates the subsampling offset described above with reference to FIG. 17. For example, when subsampling_offset is n, subsampling may be started from a point corresponding to the n+1th position in ascending or descending order of index (the index described with reference to FIG. 17) of points.

When subsampling_grouping_method indicates information (or 3) about the third method, the signaling information of FIG. 23 may further include the following information.

subsampling_representative_points (information about representative points, not shown in this figure) may indicate the representative points described above with reference to FIG. 18. For example, subsampling_representative_point may specify index information about a representative point.

subsampling_distance (information about the subsampling distance) may indicate the subsampling distance described above with reference to FIG. 18.

When subsampling_grouping_method indicates information (or 4) about the fourth method, the signaling information of FIG. 23 may further include the following information.

subsampling_lod_generation_method (information about the LOD generation method) may indicate the LOD generation method described above with reference to FIG. 19. For example, subsampling_lod_generation_method equal to 0 may indicate that the LOD is generated by the same method as that used in attribute encoding (e.g., the attribute encoding described with reference to FIGS. 1 to 15). When subsampling_lod_generation_method has a value other than 0, it indicates that the LOD generation method for subsampling is different from the LOD generation method used for attribute encoding. subsampling_lod_generation_method equal to 1 indicates that the LOD is generated based on the Euclidean distance between the points described above with reference to FIG. 19. subsampling_lod_generation_method equal to 2 indicates that the LOD is generated based on the octree structure described above with reference to FIG. 19. subsampling_lod_generation_method equal to 3 indicates that the LOD is generated based on the Morton codes of the points described above with reference to FIG. 19.

subsampling_lod_num (information about an LOD to be subsampled) indicates the LOD to be subsampled described above with reference to FIG. 19. For example, subsampling_lod_num equal to n indicates that an attribute of points included in LOD n is subsampled.

The point cloud data reception device (e.g., the point cloud data reception device of FIGS. 1, 2, 10, 13 and 14) according to the embodiments may reconstruct the attribute for the subsampled point cloud data. The reception device according to the embodiments may identify the subsampled attribute based on information about the subsampling method included in the signaling information of FIG. 23. In addition, the reception device according to the embodiments may reconstruct the subsampled attribute based on information about attribute reconstruction included in the signaling information of FIG. 23. The reconstruction of the attribute according to the embodiments may be referred to as attribute restoration or attribute interpolation.

The information about the reconstruction of the attribute according to embodiments may include at least one of the following pieces of information.

subsampling_reconstruction_method (information about the reconstruction method) indicates an attribute reconstruction method carried out by the reception device.

subsampling_reconstruction_method equal to 0 indicates that the above-described reconstruction is performed based on the copy value of the attribute of the neighbor point (e.g., the neighbor point described above with reference to FIGS. 4 and 9) of the point (or target point) corresponding to the attribute to be reconstructed (or target attribute). For example, the target attribute may be reconstructed as the attribute of a neighbor point positioned closest to the target point. The following equation may be used for a method for reconstruction based on attribute copy values of neighbor points.

$$\hat{a}(x, y) = a(x+i,\ y+j) \quad \text{[Equation 1]}$$

$\hat{a}(x, y)$ denotes a target attribute, and $a(x+i, y+j)$ denotes an attribute of a neighbor point of the target point.

In response to subsampling_reconstruction_method equal to 0, the above-described information about the reconstruction of the attribute may further include the following information.

num_neighbor_point (information about neighbor points) may indicate information about the number of one or more neighbor points of the target point. The neighbor points represent the neighbor points used for the reconstruction method described above. For example, num_neighbor_point may indicate 1.

subsampling_reconstruction_method equal to 1 indicates that the target attribute is reconstructed based on the average value of the attribute of one or more neighbor points of the target point. For example, the target attribute may be reconstructed as an average of the attribute values of three neighbor points positioned closest to the target point. The reconstruction method based on the average of the attribute values of the neighbor points may use the following equation.

$$\hat{a}(x, y) = \frac{1}{\sum_{(i,j)\in N} \omega(i, j)} \sum_{(i,j)\in N} \omega(i, j) a(x+i,\ y+j) \quad \text{[Equation 2]}$$

$$\omega(i, j) = \frac{1}{\alpha \cdot d(x+i,\ y+j)}$$

$\hat{a}(x,y)$ denotes a target attribute, and $a(x+i, y+j)$ denotes an attribute of a neighbor point of the target point. $d(x+i, y+j)$ denotes the distance (e.g., Euclidean distance) from the target point to $a(x+i, y+j)$. $\alpha$ denotes an arbitrary constant. The arbitrary constant may be a value preset in the reception device. That is, $\omega(i,j)$ denotes a value based on the reciprocal of the distance from the target point to each neighbor point. That is, the average of the attribute values of the neighbor points may be a value reflecting a value based on the reciprocal of the distance from the target point to each neighbor point. Accordingly, the target attribute may be reconstructed as an average of the attribute values of the neighbor points calculated in consideration of the distance from the target point to each neighbor point.

In response to subsampling_reconstruction_method equal to 1, the above-described information about the reconstruction of the attribute may further include the following information.

num_neighbor_point (information about neighbor points) may indicate information about the number of one or more neighbor points of the target point. The neighbor points represent the neighbor points used for the reconstruction method described above. For example, num_neighbor_point may indicate a value greater than or equal to 2.

subsampling_reconstruction_method equal to 2 indicates that the target attribute is reconstructed based on a reference attribute related to the target attribute. For example, the target attribute may be reconstructed based on the ratio of the reference attribute among the attributes of neighbor points of the target point. For example, when the color attribute including an R channel, a G channel, and a B channel is subsampled, the G channel may be reconstructed first. The G channel may be reconstructed using the above-described attribute copy value of neighbor points or the average of the neighbor points. The G channel corresponds to a reference attribute related to the target attribute according to the embodiments. The reception device may calculate a ratio of the G channel (e.g., G channel/R channel and G channel/B channel) for the attribute of neighbor points of the target point. The reception device may reconstruct the R channel and the B channel of the target attribute based on the calculated ratio. The reference attribute may be reconstructed first as described above or may be delivered to the reception device through a bitstream. Information indicating the type of the reference attribute (or information about the reference attribute) may be added to the signaling information described with reference to FIG. 23 and delivered to the reception device. The reference attribute type may have an attribute type preconfigured in the reception device. The above-described method may use the following equation.

$$\hat{a}(x, y) = \frac{1}{\sum_{(i,j)\in N} \omega(i, j)} \sum_{(i,j)\in N} \omega(i, j) \frac{a(x+i, y+j)}{b(x+i, y+j)} \hat{b}(x, y) \quad \text{[Equation 3]}$$

$\hat{a}(x,y)$ denotes a target attribute, and $a(x+i, y+j)$ denotes the attributes of neighbor points of the target point. $\omega(i,j)$ is the same as described above. $\hat{b}(x, y)$ denotes the reference attribute of the target point. $b(x+i, y+j)$ denotes a reference attribute of the neighbor points. That is, the target attribute may be reconstructed by multiplying the reference attribute of the target point by the average of the ratio of the reference attribute to the attributes of the neighbor points. Also, the average of the ratio of the reference attribute to the attributes of the neighbor points described above may be a value reflecting the distance between the target point and the neighbor points.

In response to subsampling_reconstruction_method equal to 2, the above-described information about the reconstruction of the attribute may further include the following information.

num_neighbor_point (information about neighbor points) may indicate information about the number of one or more neighbor points of the target point. The neighbor points represent the neighbor points used for the reconstruction method described above. For example, num_neighbor_point may indicate a value greater than or equal to 2.

ref_attr (information about the reference attribute, not shown in this figure) may indicate the type of the reference attribute. For example, ref_attr equal to 0 indicates a first channel (the R channel among RGB) among the channels included in the subsampled attribute. ref_attr equal to 1 indicates a second channel (G channel among RGB) among the channels included in the subsampled attribute. ref_attr equal to 2 indicates a third channel (B channel among RGB) among the channels included in the subsampled attribute.

subsampling_reconstruction_method equal to 3 indicates that the target attribute is reconstructed based on a reference attribute related to the target attribute. For example, the target attribute may be reconstructed based on the ratio of the reference attribute among the attributes of neighbor points of the target point. For example, when the color attribute including an R channel, a G channel, and a B channel is subsampled, the G channel may be reconstructed first. The G channel may be reconstructed using the above-described attribute copy value of neighbor points or the average of the neighbor points. The G channel corresponds to a reference attribute related to the target attribute according to the embodiments. The reception device may calculate a ratio of the G channel (e.g., G channel-R channel and G channel-B channel) for the attribute of neighbor points of the target point. The reception device may reconstruct the R channel and the B channel of the target attribute based on the calculated ratio (or the difference between the reference attribute and the attributes excluding the reference attribute). The reference attribute is the same as described above. The above-described method may use the following equation.

$$\hat{a}(x, y) = \frac{1}{\sum_{(i,j)\in N} \omega(i, j)} \sum_{(i,j)\in N} \omega(i, j)[a(x+i, y+j) - b(x+i, y+j)] + \hat{b}(x, y) \quad \text{[Equation 4]}$$

$\hat{a}(x,y)$ denotes a target attribute, and $a(x+i, y+j)$ denotes the attributes of neighbor points of the target point. $\omega(i,j)$, $\hat{b}(x, y)$, and $b(x+i, y+j)$ are the same as those described above. That is, the target attribute may be reconstructed by adding the average of the ratio of the reference attribute to the attributes of the neighbor points (or the difference between the reference attribute and the attributes excluding the reference attribute) to the reference attribute of the target point. Also, the average of the ratio of the reference attribute to the attributes of the neighbor points described above may be a value reflecting the distance between the target point and the neighbor points.

In response to subsampling_reconstruction_method equal to 3, the above-described information about the reconstruction of the attribute may further include the following information.

num_neighbor_point (information about neighbor points) may indicate information about the number of one or more neighbor points of the target point. The neighbor points represent the neighbor points used for the reconstruction method described above. For example, num_neighbor_point may indicate a value greater than or equal to 2.

ref_attr (information about the reference attribute, not shown in this figure) may indicate the type of the reference attribute. The ref_attr is the same as that described above.

subsampling_reconstruction_method equal to 4 indicates that the target attribute is reconstructed based on a reference attribute related to the target attribute. For example, the target attribute is reconstructed by an equation (e.g., a linear equation) with the reference attribute as a variable. The information (or modeling information) for modeling the equation and the information (or coefficient information) for the coefficients of the equation may be added to the signaling information described with reference to FIG. 23 and delivered to the reception device, or may be preconfigured in the reception device. The reception device may calculate the above-described coefficient information through linear regression. The reference attribute is the same as that described above. The above-described method may use the following equation.

$$\text{Linear equation model: } \hat{a}(x, y) = c_0 \cdot b(x, y) + c_1 \quad \text{[Equation 5]}$$

$$\text{Quadratic equation model: } \hat{a}(x, y) = c_0 \cdot b^2(x, y) + c_1 \cdot b(x, y) + c_2$$

$$\ldots$$

$$Nth\text{-order equation model: } \hat{a}(x, y) = c_0 \cdot b^N(x, y) + c_1 \cdot b^{N-1}(x, y) + \ldots\ c_{N-1} \cdot b(x, y) + c_N$$

$\hat{a}(x,y)$ denotes a target attribute, and $b(x, y)$ denotes the reconstructed reference attribute of the target point. $c_0$ to $c_N$ denote the coefficients of the equation. That is, the target attribute may be reconstructed based on a reference attribute reconstructed first and the equation for reconstruction as described above. The equation for reconstruction is reconstructed based on the above-described modeling information and coefficient information. The modeling information specifies order information about the equation. For example, when the modeling information indicates 2, the equation for reconstruction has a quadratic equation model. The coefficient information may indicate a coefficient value for an equation according to the modeling information. For example, when the modeling information indicates 2, the coefficient information may indicate values corresponding to $c_0$, $c_1$, and $c_2$.

In response to subsampling_reconstruction_method equal to 4, the above-described information about the reconstruction of the attribute may further include the following information.

num_neighbor_point (information about neighbor points) may indicate information about the number of one or more neighbor points of the target point. The neighbor points represent the neighbor points used for the reconstruction method described above. For example, num_neighbor_point may indicate a value greater than or equal to 2.

ref_attr (information about the reference attribute, not shown in this figure) may indicate the type of the reference attribute. The ref_attr is the same as that described above.

modeling_type (modeling information) indicates the order of the equation for reconstruction. The modeling_type is the same as that of the above-described modeling information.

num_rec_coeff (information about the number of coefficients) indicates the number of coefficients used in the equation for reconstruction. That is, num_rec_coeff indicates the number of coefficient values for an equation according to the modeling information. For example, num_rec_coeff has an integer greater than or equal to 1.

In response to num_rec_coeff having an integer equal to or greater than 1, the information about the reconstruction of the attribute described with reference to FIG. 23 may further include the following information identified by j. The identifier j may be greater than or equal to 0 and less than the value indicated by num_rec_coeff.

rec_coeff (coefficient information) may indicate a coefficient value for an equation according to modeling information. The rec_coeff is the same as that of the above-described coefficient information.

subsampling_reconstruction_method equal to 5 indicates that the target attribute is reconstructed based on one or more reference attributes related to the target attribute. For example, the target attribute is reconstructed by an equation (e.g., a linear equation) with the one or more reference attributes as variables. The reference attributes and equation are the same as those described above. The above-described method may use the following equation.

$$\text{Linear equation model: } \hat{a}(x, y) = c_0 \cdot b_1(x, y) + b_2(x, y) \quad \text{[Equation 6]}$$

$$\text{Quadratic equation model: } \hat{a}(x, y) = c_0 \cdot b_1^2(x, y) + c_1 \cdot b_2^2(x, y) + c_3 \cdot b_1(x, y) \cdot b_2(x, y) + c_4 \cdot b_1(x, y) + c_5 \cdot b_2(x, y) + c_6$$

$$\ldots$$

$\hat{a}(x, y)$ denotes a target attribute, and $b_1(x, y)$ and $b_2(x, y)$ denote one or more reference attributes. $c_0$ to $c_N$ denote the coefficients of the equation. That is, the target attribute may be reconstructed based on a reference attribute reconstructed first and the equation for reconstruction as described above. The equation for reconstruction is reconstructed based on the above-described modeling information and coefficient information. For example, when the modeling information indicates 1, the equation for reconstruction has a linear equation model. The coefficient information may indicate a coefficient value for an equation according to the modeling information. For example, when the modeling information indicates 1, the coefficient information may indicate a value corresponding to $c_0$.

In response to subsampling_reconstruction_method equal to 5, the above-described information about the reconstruction of the attribute may further include the following information.

num_neighbor_point (information about neighbor points) may indicate information about the number of one or more neighbor points of the target point. The neighbor points represent the neighbor points used for the reconstruction method described above. For example, num_neighbor_point may indicate a value greater than or equal to 2.

ref_attr (information about the reference attribute, not shown in this figure) may indicate the type of the reference attribute. The ref_attr is the same as that described above.

modeling_type (modeling information) indicates the order of the equation for reconstruction. The modeling_type is the same as that of the above-described modeling information.

num_rec_coeff (information about the number of coefficients) indicates the number of coefficients used in the equation for reconstruction. That is, num_rec_coeff indicates the number of coefficient values for an equation according to the modeling information. For example, num_rec_coeff has an integer greater than or equal to 1.

In response to num_rec_coeff having an integer equal to or greater than 1, the information about the reconstruction of the attribute described with reference to FIG. 23 may further include the following information identified by j. The identifier j may be greater than or equal to 0 and less than the value indicated by num_rec_coeff.

rec_coeff (coefficient information) may indicate a coefficient value for an equation according to modeling information. The rec_coeff is the same as that of the above-described coefficient information.

subsampling_reconstruction_method equal to 6 indicates that the target attribute is reconstructed based on a reference attribute related to the target attribute. For example, reconstruction of the target attribute may be performed as follows.

1) Calculate a reconstruction value of the reference attribute is based on the above-described methods (e.g., the methods used when subsampling_reconstruction_method is 0 to 5), on the assumption that the reference attribute is subsampled for a neighbor point including the reference attribute.
2) Calculate a residual (or difference) between the reference attribute included in the attribute of the neighbor point and the reconstructed reference attribute.
3) Calculate a residual (or predicted residual) of the target attribute based on the residual of the reference attribute, on the assumption that the residual of the reference attribute has a linear relationship with the residual of the target attribute.
4) Calculate a reconstruction value of the target attribute through the above-described methods (e.g., the methods used when subsampling_reconstruction_method is 0 to 5) for the target attribute.
5) Add the calculated reconstruction value of the target attribute and the calculated predicted residual of the target attribute.

The reception device according to the embodiments may reconstruct the target attribute more accurately through the above-described operations than when using the above-described methods (e.g., the methods used when subsampling_reconstruction_method is 0 to 5). The above-described operations may be represented as the following equation.

$$r_a(x, y) = c_0 \cdot r_b(x, y) + c_1 \quad \text{[Equation 7]}$$

$$\hat{a}(x, y) = r_a(x, y) + p(x, y)$$

$\hat{a}(x, y)$ denotes the target attribute, $r_a(x,y)$ denotes the predicted residual of the target attribute, $p(x,y)$ denotes the predicted value of the target attribute, and $r_b(x,y)$ denotes the residual of the reference attribute. $c_0$ and $c_1$ are coefficients for the equation for the residual of the reference attribute and the residual of the target attribute. The equation for the residual of the reference attribute and the residual of the target attribute may be defined by the above-described modeling information and coefficient information. The modeling information and the coefficient information are the same as those described above.

In response to subsampling_reconstruction_method equal to 6, the above-described information about the reconstruction of the attribute may further include the following information.

num_neighbor_point (information about neighbor points) may indicate information about the number of one or more neighbor points of the target point. The neighbor points represent the neighbor points used for the reconstruction method described above. For example, num_neighbor_point may indicate a value greater than or equal to 2.

ref_attr (information about the reference attribute, not shown in this figure) may indicate the type of the reference attribute. The ref_attr is the same as that described above.

modeling_type (modeling information) indicates the order of the equation for reconstruction. The modeling_type is the same as that of the above-described modeling information.

num_rec_coeff (information about the number of coefficients) indicates the number of coefficients used in the equation for reconstruction. That is, num_rec_coeff indicates the number of coefficient values for an equation according to the modeling information. For example, num_rec_coeff has an integer greater than or equal to 1.

In response to num_rec_coeff having an integer equal to or greater than 1, the information about the reconstruction of the attribute described with reference to FIG. 23 may further include the following information identified by j. The identifier j may be greater than or equal to 0 and less than the value indicated by num_rec_coeff.

rec_coeff (coefficient information) may indicate a coefficient value for an equation according to modeling information. The rec_coeff is the same as that of the above-described coefficient information.

The transmission device according to the embodiments may transmit the signaling information described with reference to FIG. 23 to the reception device. The signaling information described with reference to FIG. 23 may be included in the SPS, GPS, TPS, APS, ash and/or gsh and delivered to the reception device. The reception device according to the embodiments may identify the subsampled attribute based on the signaling information described with reference to FIG. 23 and reconstruct the subsampled attribute.

FIG. 24 illustrates a structure of a sequential parameter set (SPS) of point cloud data according to embodiments.

A bitstream of point cloud data according to embodiments may include a sequential parameter set (SPS) including signaling information (or flags) as shown in this figure. The SPS may refer to the SPS 27001 described with reference to FIG. 19. The point cloud data receiver according to the embodiments may decode the point cloud data based on the signaling information (or flag information) of this figure.

profile_idc indicates a profile to which the bitstream conforms as specified in Annex A. Bitstreams shall not contain values of profile_idc other than those specified in Annex A. Other values of profile_idc are reserved for future use by ISO/IEC.

profile_compatibility_flags equal to 1, indicates that the bitstream conforms to the profile indicated by profile_idc equal to j as specified in Annex A. The value of profile_compatibility_flag[j] shall be equal to 0 for any value of j that is not specified as an allowed value of profile_idc in Annex A.

level_idc indicates a level to which the bitstream conforms as specified in Annex A. Bitstreams may not contain values of level_idc other than those specified in Annex A. Other values of level_idc are reserved for future use by ISO/IEC.

sps_bounding_box_present_flag equal to 1 specifies the bounding box offset and size information is signalled. sps_bounding_box_present_flag equal to 0 specifies)

When the value of sps_bounding_box_present_flag is TRUE, the SPS according to the embodiments further includes sps_bounding_box_offset_x, sps_bounding_box_offset_y, sps_bounding_box_offset_z, sps_bounding_box_scale_factor, sps_bounding_box_size_width, sps_bounding_box_size_height, and sps_bounding_box_size_depth.

sps_bounding_box_offset_x indicates the x offset of the source bounding box in the Cartesian coordinates. When not present, the value of sps_bounding_box_offset_x is inferred to be 0.

sps_bounding_box_offset_y indicates the y offset of the source bounding box in the Cartesian coordinates. When not present, the value of sps_bounding_box_offset_y is inferred to be 0.

sps_bounding_box_offset_z indicates the z offset of the source bounding box in the Cartesian coordinates. When not present, the value of sps_bounding_box_offset_z is inferred to be 0.

sps_bounding_box_scale_factor indicates the scale factor the source bounding box in the Cartesian coordinates. When not present, the value of sps_bounding_box_scale_factor is inferred to be 1. Indicates. When not present, the value of sps_bounding_box_scale_factor is inferred to be 0.

sps_bounding_box_size_width indicates the width of the source bounding box in the Cartesian coordinates. When not present, the value of sps_bounding_box_size_width is inferred to be a specific value (such as 10).

sps_bounding_box_size_height indicates the height of the source bounding box in the Cartesian coordinates. When not present, the value of sps_bounding_box_size_height is inferred to be 1. When not present, the value of sps_bounding_box_size_hieght is inferred to be 0.

sps_bounding_box_size_depth indicates the depth of the source bounding box in the Cartesian coordinates. When not present, the value of sps_bounding_box_size_depth is inferred to be 1. When not present, the value of sps_bounding_box_size_depth is inferred to be 0.

sps_source_scale_factor indicates the scale factor of the source point cloud.

sps_seq_parameter_set_id provides an identifier for the SPS for reference by other syntax elements. In The value of sps_seq_parameter_set_id may be in the range of 0 to 15, inclusive in bitstreams conforming to this version of this Specification. The value other than 0 for sps_seq_parameter_set_id is reserved for future use by ISO/IEC.

sps_num_attribute_sets indicates the number of coded attributes in the bitstream. The value of sps_num_attribute_sets may be in the range of 0 to 64.

attribute_dimension[i] specifies the number of components of the i-th attribute. Index i may be greater than or equal to 0, and may be less than a value indicated by sps_num_attribute_sets.

attribute instance id[i] specifies attribute instance id.

attribute_bitdepth[i] specifies the bitdepth of the i-th attribute signal(s).

attribute_cicp_colour_primaries[i] indicates the chromaticity coordinates of the colour attribute source primaries.

attribute_cicp_transfer_characteristics[i] either indicates the reference opto-electronic transfer characteristic function of the colour attribute as a function of a source input linear optical intensity Lc with a nominal real-valued range of 0 to 1 or indicates the inverse of the reference electro-optical transfer characteristic function as a function of an output linear optical intensity Lo with a nominal real-valued range of 0 to 1.

attribute_cicp_matrix_coeffs[i] describes the matrix coefficients used in deriving luma and chroma signals from the green, blue, and red, or Y, Z, and X primaries.

attribute_cicp_video_full_range_flag[i] specifies that the black level and range of the luma and chroma signals as derived from E' Y, E' PB, and E' PR or E' R, E' G, and E' B real-valued component signals.

known_attribute_label_flag[i] equal to 1 specifies that know_attribute_label is signalled for the i-th attribute. known_attribute_label_flag[i] equal to 0 specifies that attribute_label_four_bytes is signalled for the i-th attribute.

known_attribute_label[i] equal to 0 specifies that the attribute is colour. known_attribute_label[i] equal to 1 specifies that the attribute is reflectance. known_attribute_label[i] equal to 2 specifies that the attribute is frame index.

The SPS according to the embodiments may further include the following information for subsampling of point cloud data and/or reconstruction of the subsampling.

subsampling_enable_flag (information indicating that the attribute corresponds to some attributes) may indicate whether the attribute information (or attribute) included in the bitstream corresponds to some attributes. As described above with reference to FIG. 15, the transmission device may selectively compress the attribute of the point cloud data through subsampling and transmit the same to the reception device. That is, the attribute included in the bitstream received by the reception device may correspond to all attributes or some attributes of the point cloud data. Accordingly, subsampling_enable_flag may indicate whether attribute subsampling has been performed by the transmission device. For example, subsampling_enable_flag equal to 0 indicates that the attribute included in the bitstream corresponds to all attributes of the point cloud data. That is, it indicates that attribute subsampling has not been performed by the transmission device. subsampling_enable_flag equal to 1 indicates that the attribute included in the bitstream corresponds to some attributes of the point cloud data. That is, it indicates that attribute subsampling has been performed by the transmission device.

In response to subsampling_enable_flag indicating that the attribute included in the bitstream corresponds to some attributes of the point cloud data, the SPS according to the embodiments may further include the following information.

subsampling_info (signaling information about a subsampling scheme) represents the signaling information about the subsampling scheme described above with reference to FIG. 23. The reception device according to the embodiments may identify the subsampled attribute based on the signaling information about the subsampling scheme and reconstruct the subsampled attribute.

sps_extension_present_flag equal to 1 specifies that the sps_extension_data syntax structure is present in the SPS RBSP syntax structure. sps_extension_present_flag equal to 0 specifies that this syntax structure is not present. When not present, the value of sps_extension_present_flag is inferred to be equal to 0.

sps_extension_data flag may have any value. Its presence and value do not affect decoder conformance to profiles specified in Annex A Decoders conforming to a profile specified in Annex A.

The signaling information included in the bitstream according to the embodiments may be generated by one or more elements in the metadata processor or the transmission processor (e.g., the metadata processing unit 12007 or the transmission processor 12012 of FIG. 12). The signaling information may be generated based on a result of geometry encoding and/or attribute encoding. The point cloud data transmission device according to the embodiments may transmit the bitstream in the above-described form, thereby increasing compression efficiency and reducing an image quality performance and a burden on the reception device.

FIG. 25 illustrates a structure of a geometry parameter set (GPS) of point cloud data according to embodiments A bitstream of point cloud data according to embodiments may include a geometry parameter set including the signaling information (or flags) of this figure. The geometry parameter set of this figure may represent the geometry parameter set 27002 described with reference to FIG. 19. The point cloud data receiver according to the embodiments may decode the point cloud data based on the signaling information (or flag information) of this figure.

The GPS according to embodiments may further include the following information for subsampling of point cloud data and/or reconstruction of the subsampling.

subsampling_enable_flag (information indicating that the attribute corresponds to some attributes) may indicate whether the attribute information (or attribute) included in the bitstream corresponds to some attributes. As described above with reference to FIG. 15, the transmission device may selectively compress the attribute of the point cloud data through subsampling and transmit the same to the reception device. That is, the attribute included in the bitstream received by the reception device may correspond to all attributes or some attributes of the point cloud data. Accordingly, subsampling_enable_flag may indicate whether attribute subsampling has been performed by the transmission device. For example, subsampling_enable_flag equal to 0 indicates that the attribute included in the bitstream corresponds to all attributes of the point cloud data. That is, it indicates that attribute subsampling has not been performed by the transmission device. subsampling_enable_flag equal to 1 indicates that the attribute included in the bitstream corresponds to some attributes of the point cloud data. That is, it indicates that attribute subsampling has been performed by the transmission device.

In response to subsampling_enable_flag indicating that the attribute included in the bitstream corresponds to some attributes of the point cloud data, the GPS according to the embodiments may further include the following information.

subsampling_info (signaling information about a subsampling scheme) represents the signaling information about the subsampling scheme described above with reference to FIG. 23. The reception device according to the embodiments may identify the subsampled attribute based on the signaling information about the subsampling scheme and reconstruct the subsampled attribute.

The signaling information included in the bitstream according to the embodiments may be generated by one or more elements in the metadata processor or the transmission processor (e.g., the metadata processing unit 12007 or the transmission processor 12012 of FIG. 12). The signaling information may be generated based on a result of geometry encoding and/or attribute encoding. The point cloud data transmission device according to the embodiments may transmit the bitstream in the above-described form, thereby increasing compression efficiency and image quality performance and reducing a burden on the reception device.

FIG. 26 illustrates a structure of an attribute parameter set (APS) of point cloud data according to embodiments A bitstream of point cloud data according to embodiments may include an attribute parameter set 2200 including the signaling information (or flag) of this figure. The attribute parameter set in this figure may represent the APS 27003 described with reference to FIG. 19. The point cloud data receiver according to the embodiments may decode the point cloud data based on the signaling information (or flag information) of this figure.

The APS according to embodiments may further include the following information for subsampling of point cloud data and/or reconstruction of the subsampling.

subsampling_enable_flag (information indicating that the attribute corresponds to some attributes) may indicate whether the attribute information (or attribute) included in the bitstream corresponds to some attributes. As described above with reference to FIG. 15, the transmission device may selectively compress the attribute of the point cloud data through subsampling and transmit the same to the reception device. That is, the attribute included in the bitstream received by the reception device may correspond to all attributes or some attributes of the point cloud data. Accordingly, subsampling_enable_flag may indicate whether attribute subsampling has been performed by the transmission device. For example, subsampling_enable_flag equal to 0 indicates that the attribute included in the bitstream corresponds to all attributes of the point cloud data. That is, it indicates that attribute subsampling has not been performed by the transmission device. subsampling_enable_flag equal to 1 indicates that the attribute included in the bitstream corresponds to some attributes of the point cloud data. That is, it indicates that attribute subsampling has been performed by the transmission device.

In response to subsampling_enable_flag indicating that the attribute included in the bitstream corresponds to some attributes of the point cloud data, the APS according to the embodiments may further include the following information.

subsampling_info (signaling information about a subsampling scheme) represents the signaling information about the subsampling scheme described above with reference to FIG. 23. The reception device according to the embodiments may identify the subsampled attribute based on the signaling information about the subsampling scheme and reconstruct the subsampled attribute.

The signaling information included in the bitstream according to the embodiments may be generated by one or more elements in the metadata processor or the transmission processor (e.g., the metadata processing unit 12007 or the transmission processor 12012 of FIG. 12). The signaling information may be generated based on a result of geometry encoding and/or attribute encoding. The point cloud data transmission device according to the embodiments may transmit the bitstream in the above-described form, thereby increasing compression efficiency and image quality performance and reducing a burden on the reception device.

FIG. 27 illustrates a structure of a tile parameter set (TPS) of point cloud data according to embodiments.

A bitstream of point cloud data according to embodiments may include a tile parameter set including the signaling information (or flag) shown in this figure. The tile parameter set 28000 shown in this figure may refer to the TPS 27004 described with reference to FIG. 19. The point cloud data receiver according to the embodiments may decode the point cloud data based on the signaling information (or flag information) illustrated in this figure.

The TPS 28000 may represent a syntax structure including syntax elements that apply to zero or more entire tiles (or encoded tiles).

num_tiles represents the number of tiles signaled for the bitstream. When not present, num_tiles may be inferred to be 0.

The TPS 28000 may include information about positions at which tiles present in the bitstream are positioned within a bounding box (e.g., tile_bounding_box_offset_x, tile_bounding_box_offset_y, tile_bounding_box_offset_z, etc.), scale factor information in the bounding box of tiles (e.g., tile_bounding_box_scale_factor, etc.), width or height information (e.g., tile_bounding_box_size_width, tile_bounding_box_size_height) about the bounding box of tiles.

The TPS 28000 may include parameters (e.g., tile_bounding_box_offset_x, tile_bounding_box_offset_y, tile_bounding_box_offset_z, tile_bounding_box_scale_factor, tile_bounding_box_size_width, tile_bounding_box_size_height) included in the for loop of FIG. 27 as many as the number of tiles. In FIG. 27, i may represent an index for each tile. tile_bounding_box_offset_x[i], tile_bounding_box_offset_y[i], tile_bounding_box_offset_z[i], tile_bounding_box_scale_factor[i], tile_bounding_box_size_width[i], and tile_bounding_box_size_height[i] may represent tile_bounding_box_offset_x, tile_bounding_box_offset_y, tile_bounding_box_offset_z, tile_bounding_box_scale_factor, tile_bounding_box_size_width, and tile_bounding_box_size_height of the i-th tile in the for loop, respectively.

tile_bounding_box_offset_x[i] indicates the x offset of the i-th tile in the Cartesian coordinates. When the parameter is not present (namely, the tile_bounding_box_size_offset_x for the i-th tile that is not 0 is not present), the value of tile_bounding_box_offset_x[0] may be inferred to be sps_bounding_box_offset_x included in the SPS.

tile_bounding_box_offset_y[i] indicates the y offset of the i-th tile in the Cartesian coordinates. When the parameter is not present (namely, tile_bounding_box_size_offset_y for the i-th tile that is not 0 is not present), the value of tile_bounding_box_offset_y[0] may be inferred to be sps_bounding_box_offset_y included in the SPS.

tile_bounding_box_offset_z[i] indicates the z offset of the i-th tile in the Cartesian coordinates. When the parameter is not present (namely, tile_bounding_box_size_offset_z for the i-th tile that is not 0 is not present), the value of tile_bounding_box_offset_z[0] may be inferred to be sps_bounding_box_offset_z included in the SPS.

tile_bounding_box_scale_factor[i] indicates the scale factor related to the i-th tile in the Cartesian coordinates. When the parameter is not present (namely, tile_bounding_box_size_factor for the i-th tile that is not 0 is not present), the value of tile_bounding_box_scale_factor[0] may be inferred to be sps_bounding_box_scale_factor included in the SPS.

tile_bounding_box_size_width[i] indicates the width of the i-th tile in the Cartesian coordinates. When the parameter is not present (namely, tile_bounding_box_size_width for the i-th tile that is not 0 is not present), the value of tile_bounding_box_size_width[0] may be inferred to be sps_bounding_box_size_width included in the SPS.

tile_bounding_box_size_height[i] indicates the height of the i-th tile in the Cartesian coordinates. When the parameter is not present (namely, tile_bounding_box_size_height for the i-th tile that is not 0 is not present), the value of tile_bounding_box_size_height[0] may be inferred to be sps_bounding_box_size_height included in the SPS.

tile_bounding_box_size_depth[i] indicates the depth of the i-th tile in the Cartesian coordinates. When not present, the value of tile_bounding_box_size_depth[0] may be inferred to be sps_bounding_box_size_depth included in the SPS.

The TPS according to embodiments may further include the following information for subsampling of point cloud data and/or reconstruction of the subsampling.

subsampling_enable_flag (information indicating that the attribute corresponds to some attributes) may indicate whether the attribute information (or attribute) included in the bitstream corresponds to some attributes. As described above with reference to FIG. 15, the transmission device may selectively compress the attribute of the point cloud data through subsampling and transmit the same to the reception device. That is, the attribute included in the bitstream received by the reception device may correspond to all attributes or some attributes of the point cloud data. Accordingly, subsampling_enable_flag may indicate whether attribute subsampling has been performed by the transmission device. For example, subsampling_enable_flag equal to 0 indicates that the attribute included in the bitstream corresponds to all attributes of the point cloud data. That is, it indicates that attribute subsampling has not been performed by the transmission device. subsampling_enable_flag equal to 1 indicates that the attribute included in the bitstream corresponds to some attributes of the point cloud data. That is, it indicates that attribute subsampling has been performed by the transmission device.

In response to subsampling_enable_flag indicating that the attribute included in the bitstream corresponds to some attributes of the point cloud data, the TPS according to the embodiments may further include the following information.

subsampling_info (signaling information about a subsampling scheme) represents the signaling information about the subsampling scheme described above with reference to FIG. 23. The reception device according to the embodiments may identify the subsampled attribute based on the signaling information about the subsampling scheme and reconstruct the subsampled attribute.

The signaling information included in the bitstream according to the embodiments may be generated by one or more elements in the metadata processor or the transmission processor (e.g., the metadata processing unit 12007 or the transmission processor 12012 of FIG. 12). The signaling information may be generated based on a result of geometry encoding and/or attribute encoding. The point cloud data transmission device according to the embodiments may transmit the bitstream in the above-described form, thereby increasing compression efficiency and image quality performance and reducing a burden on the reception device.

FIG. 28 illustrates a structure of an attribute slice header (ASH) of point cloud data according to embodiments.

The ASH (geometry slice header) according to the embodiments may be referred to as a geometry slice header. The GSH may refer to data having header information included in a geometry bitstream (Geom) included in one or more slices. That is, the GSH may be header information for geometry information included in the slice. The GSH, which is header information for the geometry information, may include parameters such as geom_geom_parameter_set_id, geom_tile_id, geom_slice_id, geom_BoxOrigin, geom_box_log 2_scale, beom_max_node_size_log 2, geom_num_points.

gsh_geometry_parameter_set_id specifies the value of the gps_geom_parameter_set_id of the active GPS.

gsh_tile_id specifies the id of a tile.

gsh_slice_id specifies the id of a slice.

gps_box_present_flag indicates whether a source bounding box (or a box) indicated by the GSH is present. When gps_box_present_flag is equal to 1, the GPS 31000 according to the embodiments may include some/all of gsh_box_log 2_scale, gsh_box_origin_x, gsh_box_origin_y, and gsh_box_origin_z.

gsh_box_log 2_scale indicates the scale value of a source bounding box (or box) indicated by the GSH according to the embodiments.

gsh_box_origin_x specifies the x of the source bounding box in the Cartesian coordinates.

gsh_box_origin_y specifies the y of the source bounding box in the Cartesian coordinates.

gsh_box_origin_z specifies the z of the source bounding box in the Cartesian coordinates gsh_log 2_max_nodesize specifies the value of the variable MaxNodeSize that is used in the decoding process as follows:

$$MaxNodeSize = 2(\text{gbh\_log2\_max\_nodesize}).$$

gbh_points_number specifies the number of coded points in the slice.

The information about the method of generating a Morton code included in the GSH according to embodiments may be applied in common to all slices signaled by the GSH.

The ASH according to embodiments may further include the following information for subsampling of point cloud data and/or reconstruction of the subsampling.

subsampling_enable_flag (information indicating that the attribute corresponds to some attributes) may indicate whether the attribute information (or attribute) included in the bitstream corresponds to some attributes. As described above with reference to FIG. 15, the transmission device may selectively compress the attribute of the point cloud data through subsampling and transmit the same to the reception device. That is, the attribute included in the bitstream received by the reception device may correspond to all attributes or some attributes of the point cloud data. Accordingly, subsampling enable flag may indicate whether attribute subsampling has been performed by the transmission device. For example, subsampling_enable_flag equal to 0 indicates that the attribute included in the bitstream corresponds to all attributes of the point cloud data. That is, it indicates that attribute subsampling has not been performed by the transmission device. subsampling_enable_flag equal to 1 indicates that the attribute included in the bitstream corresponds to some attributes of the point cloud data. That is, it indicates that attribute subsampling has been performed by the transmission device.

In response to subsampling_enable_flag indicating that the attribute included in the bitstream corresponds to some attributes of the point cloud data, the ASH according to the embodiments may further include the following information.

subsampling_info (signaling information about a subsampling scheme) represents the signaling information about the subsampling scheme described above with reference to FIG. 23. The reception device according to the embodiments may identify the subsampled attribute based on the signaling information about the subsampling scheme and reconstruct the subsampled attribute.

The signaling information included in the bitstream according to the embodiments may be generated by one or more elements in the metadata processor or the transmission processor (e.g., the metadata processing unit 12007 or the transmission processor 12012 of FIG. 12). The signaling information may be generated based on a result of geometry encoding and/or attribute encoding. The point cloud data transmission device according to the embodiments may transmit the bitstream in the above-described form, thereby increasing compression efficiency and image quality performance and reducing a burden on the reception device.

FIG. 29 illustrates a structure of a GSH (Geom_slice_header) of point cloud data according to embodiments.

The geometry slice header (GSH) according to the embodiments may be referred to as a geometry slice header. The GSH may refer to data having header information included in a geometry bitstream (Geom) included in one or more slices. That is, the GSH may be header information for geometry information included in the slice. The GSH, which is header information for the geometry information, may include parameters such as geom_geom_parameter_set_id, geom_tile_id, geom_slice_id, geom_BoxOrigin, geom_box_log 2_scale, beom_max_node_size_log 2, geom_num_points.

The GSH according to embodiments may further include the following information for subsampling of point cloud data and/or reconstruction of the subsampling.

subsampling_enable_flag (information indicating that the attribute corresponds to some attributes) may indicate whether the attribute information (or attribute) included in the bitstream corresponds to some attributes. As described above with reference to FIG. 15, the transmission device may selectively compress the attribute of the point cloud data through subsampling and transmit the same to the reception device. That is, the attribute included in the bitstream received by the reception device may correspond to all attributes or some attributes of the point cloud data. Accordingly, subsampling enable flag may indicate whether attribute subsampling has been performed by the transmission device. For example, subsampling_enable_flag equal to 0 indicates that the attribute included in the bitstream corresponds to all attributes of the point cloud data. That is, it indicates that attribute subsampling has not been performed by the transmission device. subsampling_enable_flag equal to 1 indicates that the attribute included in the bitstream corresponds to some attributes of the point cloud data. That is, it indicates that attribute subsampling has been performed by the transmission device.

In response to subsampling_enable_flag indicating that the attribute included in the bitstream corresponds to some attributes of the point cloud data, the GSH according to the embodiments may further include the following information.

subsampling_info (signaling information about a subsampling scheme) represents the signaling information about the subsampling scheme described above with reference to FIG. 23. The reception device according to the embodiments may identify the subsampled attribute based on the signaling information about the subsampling scheme and reconstruct the subsampled attribute.

The signaling information included in the bitstream according to the embodiments may be generated by one or more elements in the metadata processor or the transmission processor (e.g., the metadata processing unit 12007 or the transmission processor 12012 of FIG. 12). The signaling information may be generated based on a result of geometry encoding and/or attribute encoding. The point cloud data transmission device according to the embodiments may transmit the bitstream in the above-described form, thereby increasing compression efficiency and image quality performance and reducing a burden on the reception device.

Figure 30:
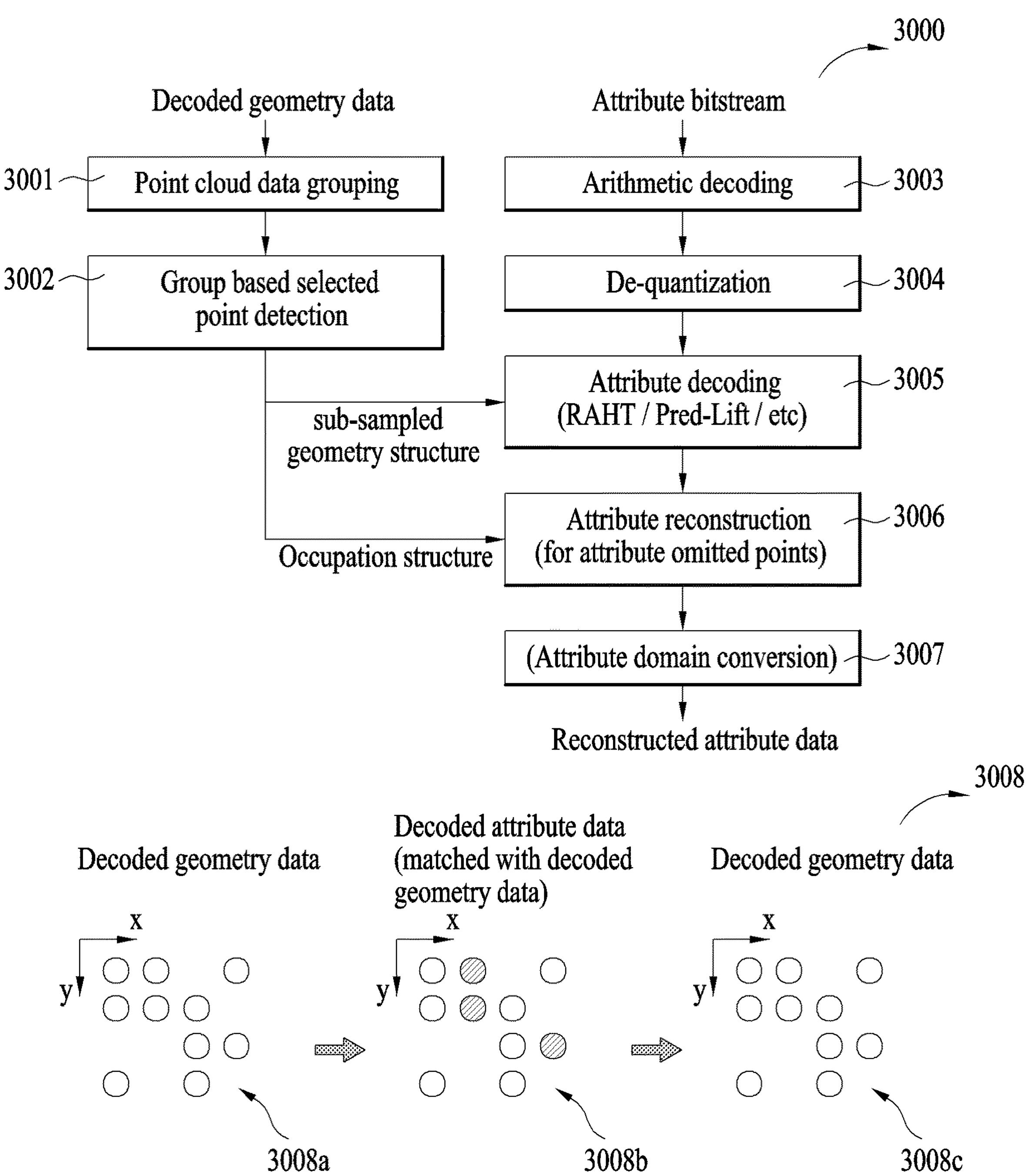
FIG. 30 is a flowchart illustrating a method of receiving point cloud data according to embodiments.

FIG. 30 is a flowchart illustrating a method of receiving point cloud data according to embodiments.

FIG. 30 illustrates a method of receiving point cloud data by a reception device (e.g., the reception device 10004 of FIG. 1, the point cloud video decoder 10006 of FIG. 1, the decoder of FIG. 10, the reception device of FIG. 13, and the XR device 1430 of FIG. 14) according to the embodiments. The flowchart 3000 of the method of receiving point cloud data according to the embodiments may include point cloud data grouping 3001, grouping based point selection 3002, arithmetic decoding 3003, dequantization 3004, attribute decoding 3005, attribute reconstruction 3006, and/or attribute inverse conversion 3007. The reception device according to the embodiments may further include one or more operations to perform the point cloud data reception method.

The point cloud data grouping 3001 and grouping based point selection 3002 according to the embodiments may correspond to the point cloud data grouping 2100 and the grouping based point selection 2101 described with reference to FIG. 21. The point cloud data grouping and grouping based point selection may be performed based on the signaling information about the subsampling scheme described with reference to FIGS. 23 to 29. The reception device according to the embodiments may identify an attribute on which subsampling is performed, based on the point cloud data grouping and the grouping based point selection.

The arithmetic decoding 3003 according to the embodiments may include entropy decoding of the point cloud data. The arithmetic decoding according to the embodiments may correspond to the reverse process of the arithmetic encoding 2106 of FIG. 21.

The dequantization 3004 according to the embodiments may include performing inverse quantization on the arithmetic decoded point cloud data. The dequantization according to the embodiments may correspond to the reverse process of the quantization 2105 of FIG. 21.

The attribute decoding 3005 according to the embodiments may include performing attribute decoding based on one of RAHT coding, predictive conversion coding, or lifting conversion coding. The attribute decoding according to the embodiments may correspond to the reverse process of the attribute encoding 2106 of FIG. 21.

Instead of performing operations 3001 and 3002, the reception device according to the embodiments may perform an operation 3008 of comparing the decoded geometry information and the decoded attribute information to identify the subsampled attribute. That is, the reception device may compare the decoded geometry information 3008*a* and the decoded attribute information 3008*b* to identify a point having no attribute as a point for which the attribute is subsampled. The reception device may reconstruct a subsampled attribute 3008*c* based on the signaling information of FIGS. 23 to 29.

The attribute reconstruction 3006 according to the embodiments may include reconstructing (or restoring) the subsampled attribute. The attribute reconstruction according to the embodiments may be performed based on attribute reconstruction information included in the signaling information described with reference to FIGS. 23 to 29. The method of reconstructing the subsampled attribute by the reception device according to the embodiments based on the above-described signaling information is the same as or similar to that described with reference to FIG. 23. The reception device may reconstruct the subsampled attribute through the attribute reconstruction according to the embodiments.

The attribute inverse conversion 3007 according to the embodiments may include inversely converting the attribute based on the reconstructed point cloud data. The attribute inverse conversion according to the embodiments may correspond to the reverse process of the attribute conversion 2103 described with reference to FIG. 21.

The reception device according to the embodiments may reconstruct the subsampled attribute according to the point cloud data transmission method described with reference to FIG. 30, and finally output (or render) the point cloud data.

Figure 31:
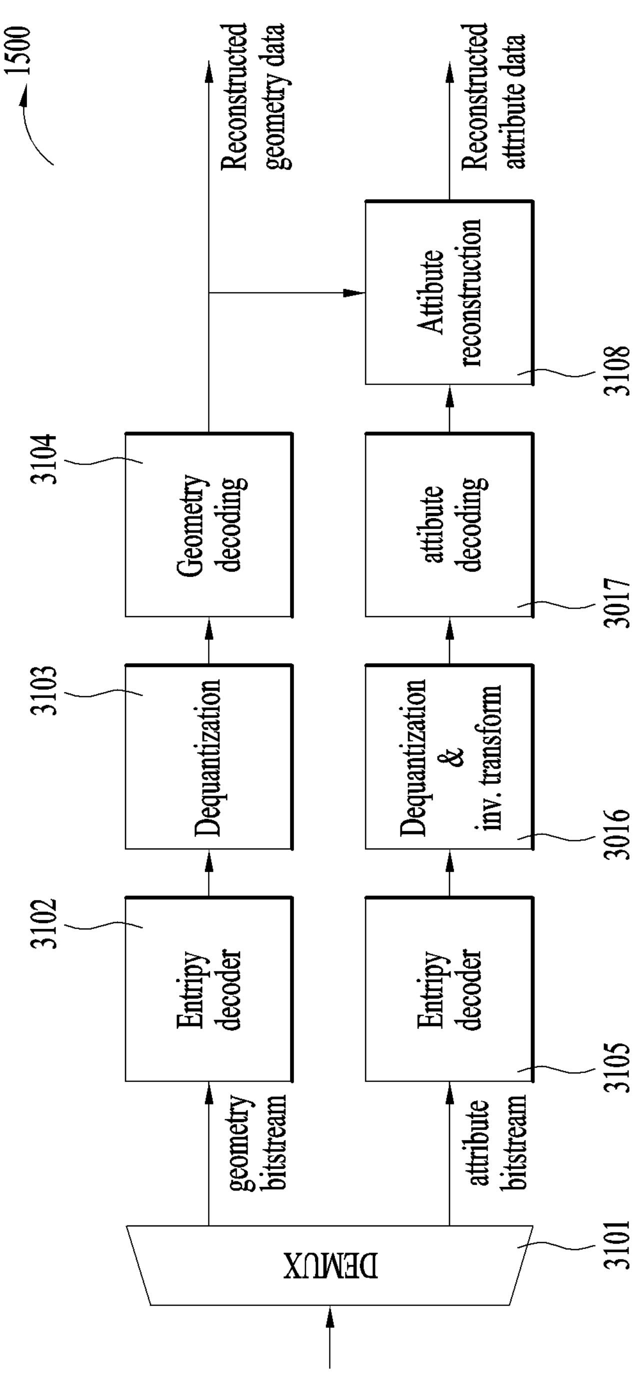
FIG. 31 is a block diagram illustrating a point cloud data reception device according to embodiments.

FIG. 31 is a block diagram illustrating a point cloud data reception device according to embodiments.

FIG. 25 is a block diagram illustrating a point cloud data reception device (e.g., the reception device 10004 of FIG. 1, the point cloud video decoder 10006 of FIG. 1, the decoder of FIG. 10, the reception device of FIG. 13, and the XR device 1430 of FIG. 14). The reception device 2500 according to the embodiments may perform the same or similar operation to the decoding operation described with reference to FIGS. 1 to 30, and may perform a reverse process of the operation of the transmission device of FIG. 15. The reception device 3100 according to the embodiments may include a receiver 3101, an entropy decoder 3102, a dequantizer 3103, a geometry decoder 3104, an entropy decoder 3105, a dequantizer 3106, an attribute decoder 3107, and/or an attribute reconstructor 3108. Although not shown in FIG. 31, the reception device according to the embodiments may further include one or more elements for performing the same or similar operation to the decoding described with reference to FIGS. 1 to 30.

The receiver 3100 according to the embodiments may receive a bitstream including a geometry bitstream and/or an attribute bitstream. As described above with reference to FIGS. 15 to 30, the attribute included in the bitstream may correspond to any one of all attributes or some attributes of the point cloud data. The receiver according to the embodiments may perform an operation corresponding to a reverse process of the operation of the multiplexer 1510 of FIG. 15.

The entropy decoder 3102 according to the embodiments may perform entropy decoding on geometry data. The entropy decoder according to the embodiments may perform the same or similar operation to the operation of the arithmetic decoder 11000 of FIG. 11. The entropy decoder according to the embodiments may perform an operation corresponding to a reverse process of the operation of the entropy coder 1504 of FIG. 15.

The dequantizer 3103 according to the embodiments may dequantize the entropy-decoded geometry data. The dequantizer according to the embodiments may perform the same or similar operation to that of the inverse quantizer 11006 of FIG. 11.

The geometry decoder 3104 according to the embodiments may perform geometry decoding on the geometry. The geometry decoder according to the embodiments may perform the same or similar operation to the geometry decoding of FIG. 11.

The entropy decoder 3105 according to the embodiments may perform entropy decoding on the attribute. The entropy decoder according to the embodiments may perform the arithmetic decoding 3003 described above with reference to FIG. 30. The entropy decoder according to the embodiments may perform an operation corresponding to a reverse process of the operation of the entropy coder 1509 of FIG. 15.

The dequantizer 3106 according to the embodiments may dequantize the entropy-decoded attribute. The dequantizer according to the embodiments may perform the dequantization 3004 described above with reference to FIG. 30. The dequantizer according to the embodiments may perform an operation corresponding to a reverse process of the operation of the quantizer 1508 of FIG. 15.

The attribute decoder 3107 according to the embodiments may perform attribute decoding. The attribute decoder according to the embodiments may perform the attribute decoding 3005 described above with reference to FIG. 30. The attribute decoder according to the embodiments may perform the same or similar operation to the attribute decoding described above with reference to FIG. 11.

The attribute reconstructor 3108 according to embodiments may perform attribute reconstruction on the decoded attribute. That is, the attribute reconstructor may perform attribute reconstruction on the subsampled attribute described with reference to FIGS. 15 to 30. As described above with reference to FIGS. 23 to 30, the attribute reconstructor may perform attribute reconstruction based on signaling information about a subsampling scheme included in a bitstream. The attribute reconstructor according to the embodiments may perform the attribute reconstruction 3006 described above with reference to FIG. 30.

The point cloud data reception device according to the embodiments may output (or render) final point cloud data based on the restored (or reconstructed) geometry information and/or the restored (or reconstructed) attribute information. In addition, the point cloud data reception device according to the embodiments may reconstruct the geometry of points based on the signaling information (signaling information described with reference to FIGS. 20 to 24) about the prediction geometry encoding scheme included in the received bitstream, and adjust the latency in the decoding operation.

Figure 32:
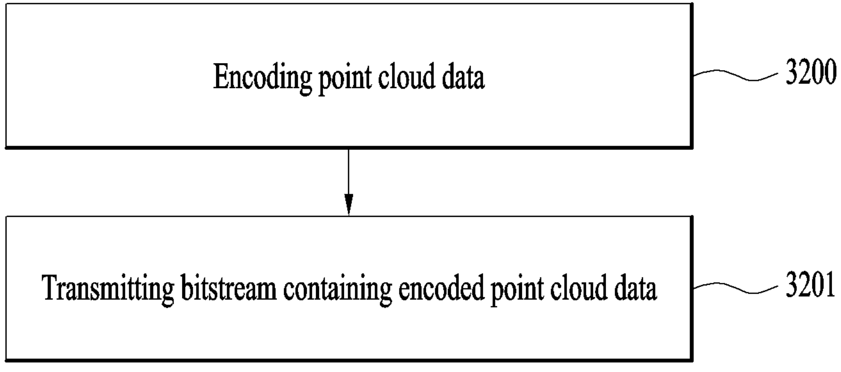
FIG. 32 is an exemplary flowchart illustrating a method of transmitting point cloud data according to embodiments.

FIG. 32 is an exemplary flowchart illustrating a method of transmitting point cloud data according to embodiments.

FIG. 32 illustrates a method of transmitting point cloud data by a point cloud data transmission device (e.g., the point cloud data transmission device described with reference to FIGS. 1, 2, 4, 11, 12 and 15) according to embodiments. The transmission device according to the embodiments performs the same or similar operation to the encoding described with reference to FIGS. 1 to 31.

The point cloud data transmission device according to the embodiments may encode the point cloud data (3200). The point cloud data transmission device according to the embodiments may include a geometry encoder configured to encode a geometry indicating a position of one or more points of the point cloud data, an attribute encoder configured to encode an attribute of the one or more points, a transmitter configured to transmit a bitstream containing the encoded point cloud data. The attribute according to the embodiments may correspond to all attributes or some attributes of the one or more points. The some attributes may correspond to attributes selected based on a subsampling scheme among all attributes. The all attributes, some attributes, and subsampling scheme according to the embodiments are the same as or similar to those described with reference to FIGS. 15 to 31.

The subsampling scheme according to the embodiments may include a subsampling method. The subsampling method may represent at least one of a first method, a second method, a third method, and a fourth method. The first method may represent a method based on the geometry of one or more points. The second method may represent a method based on an order in which the one or more points are reorganized. The third method may represent a method based on a representative point included in the one or more points and a subsampling distance. The fourth method may be a method based on a Level of Detail (LOD) generated by reorganizing the one or more points. The first to fourth methods according to the embodiments are the same as or similar to those described with reference to FIGS. 15 to 31.

The point cloud data transmission device according to the embodiments may transmit a bitstream containing encoded point cloud data. The bitstream according to the embodiments is the same as or similar to that described with reference to FIGS. 22 to 29. The bitstream according to the embodiments may contain information indicating that the attribute corresponds to some attributes (e.g., the information described with reference to FIGS. 24 to 29) and signaling information about a subsampling scheme (e.g., the signaling information described with reference to FIGS. 23 to 29). The signaling about the subsampling scheme according to the embodiments may include information about an attribute selected based on the subsampling scheme, information about a subsampling method, and information about reconstruction of the attribute. The information about the attribute selected based on the subsampling scheme, the information about the subsampling method, and the information about the reconfiguration of the attribute are the same as or similar to those described above with reference to FIGS. 23 to 29.

Based on the subsampling method according to the embodiments representing the first method, the information about the subsampling method indicates information about the first method. The signaling information may further include information about a subsampling direction, information about the subsampling unit, information about a subsampling scan order, and information about a subsampling order. The information about the subsampling direction, the information about the subsampling unit, the information about the subsampling scan order, and the information about the subsampling order are the same as or similar to those described above with reference to FIG. 23. Based on the subsampling method representing the second method, the information about the subsampling method may specify information about the second method. The signaling information may further include information about reorganization of points, information about a subsampling rate, and information about a subsampling offset. The information about the reorganization of the points, the information about the subsampling rate, and the information about the subsampling offset are the same as or similar to those described above with reference to FIG. 23. Based on the subsampling method representing the third method, the information about the subsampling method may specify information about the third method. The signaling information may further include information about a representative point and information about a subsampling distance. The information about the representative point and the information about the subsampling distance are the same as or similar to those described above with reference to FIG. 23. Based on the subsampling method representing the fourth method, the information about the subsampling method may specify information about the fourth method. The signaling information may further include information about an LOD generation method and information about an LOD to be subsampled. The information about the LOD generation method and the information about the LOD to be subsampled are the same as or similar to those described above with reference to FIG. 23.

Figure 33:
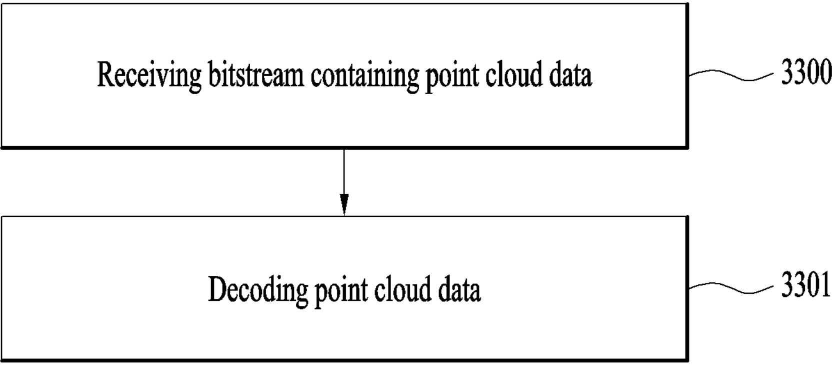
FIG. 33 is an exemplary flowchart illustrating a method of receiving point cloud data according to embodiments.

FIG. 33 is an exemplary flowchart illustrating a method of receiving point cloud data according to embodiments.

FIG. 33 illustrates a method of receiving point cloud data by a point cloud data reception device (e.g., the point cloud data reception device described with reference to FIGS. 1, 2, 11, 13 and 25) according to the embodiments. The reception device according to the embodiments performs the same or similar operation to the decoding described with reference to FIGS. 1 to 31.

The point cloud data reception device according to the embodiments may receive a bitstream containing point cloud data (3300). The bitstream according to the embodiments is the same as or similar to that described with reference to FIGS. 22 to 29.

The point cloud data reception device according to the embodiments may decode the point cloud data (3301). The point cloud data reception device includes a geometry decoder configured to decode a geometry indicating a position of one or more points of the point cloud data, and an attribute decoder configured to decode an attribute of one or more points.

The attribute according to the embodiments may correspond to all attributes or some attributes of the one or more points. The some attributes may correspond to attributes selected based on a subsampling scheme among all attributes. Based on the bitstream containing information indicating that the attribute corresponds to the some attribute, the bitstream may further contain signaling information about a subsampling scheme. The all attributes, some attributes, and subsampling scheme are the same as or similar to those described above with reference to FIGS. 15 to 31. The signaling information according to the embodiments may include information about an attribute selected based on the subsampling scheme, information about a subsampling method, and information about reconstruction of the attribute. The information about the attribute selected based on the subsampling scheme, the information about the subsampling method, and the information about the reconstruction of the attribute are the same as or similar to those described above with reference to FIGS. 23 to 29. The attribute to be reconstructed according to the embodiments may correspond to an attribute excluding the some attributes among the all attributes.

The information about the reconstruction of the attribute according to the embodiments may include information about a reconstruction method and information about one or more neighbor points of a point corresponding to the target attribute. The target attribute according to the embodiments may be reconstructed based on the attribute of the one or more neighbor points. The information about the reconstruction method and the information about the one or more neighbor points of the point corresponding to the target attribute are the same as or similar to those described above with reference to FIGS. 23 to 29. Based on the information about the reconstruction of the attribute further including information about a reference attribute related to the target attribute, the target attribute may be reconstructed based on an attribute of the one or more neighbor points and the reference attribute. The reference attribute and the information about the reference attribute are the same as or similar to those described above with reference to FIGS. 23 to 29.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

MODE FOR INVENTION

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

The invention claimed is:

1. A method comprising:

encoding geometry data of point cloud data based on an octree; and encoding attribute data for the point cloud data, wherein the encoding the attribute data includes:

encoding attribute data for a first attribute for the point cloud data; and encoding attribute data for a second attribute for the point cloud data, wherein the encoding the attribute data for the first attribute includes:

generating subsampling method information in an attribute parameter set related to the first attribute in a bitstream;

based on a first value of subsampling method information, subsampling a point of the point cloud data based on a spatial block, wherein the attribute parameter set related to the first attribute further includes information related to a size of the spatial block; and wherein the encoding the attribute data for the second attribute includes:

obtaining subsampling method information from an attribute parameter set related to the second attribute in the bitstream;

based on a second value of the subsampling method information, subsampling a point of the point cloud data based on an index of the point and a subsampling period, wherein the attribute parameter set related to the second attribute further includes information for the subsampling period.

2. The method of claim 1, based on the first value of the subsampling method information, the attribute parameter set related to the first attribute further includes information related to a subsampling direction, information related to a subsampling scan order, and information related to an index of the point.

3. The method of claim 1, based on the second value of the subsampling method information, the attribute parameter set related to the second attribute further includes information related to a subsampling offset.

4. The method of claim 1, wherein the encoding the attribute data further includes:

based on a third value of the subsampling method information, subsampling a point of the point cloud data based on a subsampling distance, wherein the bitstream further includes information related to the subsampling distance, or based on a fourth value of the subsampling method information, subsampling a point of the point cloud data based on a Levels of Detail (LoD), wherein the bitstream further includes information related to a method of generating the LoD and information related to a level number including the point.

5. The method of claim 1, wherein the method further comprising:

subsampling the attribute data including a plurality of attribute channels based on the subsampled point before the step of encoding, and wherein the value of the subsampling method information is determined independently for each of the plurality of attribute channels.

6. A device for encoding point cloud data, comprising:

a memory; and at least one processor connected to the memory, wherein the at least one processor is configured to:

encode geometry data of point cloud data based on an octree; and encode attribute data for the point cloud data, wherein, to encode the attribute data, the at least one processor is further configured to:

encode attribute data for a first attribute for the point cloud data; and encode attribute data for a second attribute for the point cloud data, wherein, to encode the attribute data for the first attribute, the at least one processor is further configured to:

generate subsampling method information in an attribute parameter set related to the first attribute in a bitstream;

based on a first value of subsampling method information, subsample a point of the point cloud data based on a spatial block, wherein the attribute parameter set related to the first attribute further includes information related to a size of the spatial block; and wherein, to encode the attribute data for the second attribute, the at least one processor is further configured to:

obtain subsampling method information from an attribute parameter set related to the second attribute in the bitstream;

based on a second value of the subsampling method information, subsample a point of the point cloud data based on an index of the point and a subsampling period, wherein the attribute parameter set related to the second further includes information for the subsampling period.

7. The device of claim 6, based on the first value of the subsampling method information, the attribute parameter set related to the first attribute further includes information related to a subsampling direction, information related to a subsampling scan order, and information related to an index of the point.

8. The device of claim 6, based on the second value of the subsampling method information, the attribute parameter set related to the second attribute further includes information related to a subsampling offset.

9. The device of claim 6, wherein, to encode the attribute data, the at least one processor is further configured to:

based on a third value of the subsampling method information, subsample a point of the point cloud data based on a subsampling distance, wherein the bitstream further includes information related to the subsampling distance, or based on a fourth value of the subsampling method information, subsample a point of the point cloud data based on a Levels of Detail (LoD), wherein the bitstream further includes information related to a method of generating the LoD and information related to a level number including the point.

10. The device of claim 6, the at least one processor is further configured to:

subsample the attribute data including a plurality of attribute channels based on the subsampled point before encoding the attribute data, and wherein the value of the subsampling method information is determined independently for each of the plurality of attribute channels.

11. A method comprising:

decoding geometry data of point cloud data from a bitstream based on an octree; and decoding attribute data for the point cloud data, wherein the decoding the attribute data includes:

decoding attribute data for a first attribute for the point cloud data; and decoding attribute data for a second attribute for the point cloud data, wherein the decoding the attribute data for the first attribute includes:

obtaining subsampling method information from an attribute parameter set related to the first attribute in the bitstream;

based on a first value of subsampling method information, subsampling a point of the point cloud data based on a spatial block, wherein the attribute parameter set related to the first attribute further includes information related to a size of the spatial block; and wherein the decoding the attribute data for the second attribute includes:

obtaining subsampling method information from an attribute parameter set related to the second attribute in the bitstream; and based on a second value of the subsampling method information, subsampling a point of the point cloud data based on an index of the point and a subsampling period, wherein the attribute parameter set related to the second attribute further includes information for the subsampling period.

12. The method of claim 11, based on the first value of the subsampling method information, the attribute parameter set related to the first attribute further includes information related to a subsampling direction, information related to a subsampling scan order, and information related to an index of the point, and based on the second value of the subsampling method information, the attribute parameter set related to the second attribute further includes information related to a subsampling offset.

13. The method of claim 11, wherein the decoding the attribute data further includes:

based on a third value of the subsampling method information, subsampling a point of the point cloud data based on a subsampling distance, wherein the bitstream further includes information related to the subsampling distance, or based on a fourth value of the subsampling method information, subsampling a point of the point cloud data based on a Levels of Detail (LoD), wherein the bitstream further includes information related to a method of generating the LoD and information related to a level number including the point.

14. The method of claim 11, wherein the bitstream further includes information related to a reconstructing method, and information related to a number of one or more neighboring points of the point, and wherein the attribute data to be reconstructed is reconstructed based on attribute data of the one or more neighbor points.

15. The method of claim 14, wherein the bitstream further includes information related to a reference attribute representing a type of an attribute channel, and wherein the attribute data to be reconstructed is reconstructed further based on the attribute data of the reference attribute.

16. A device for decoding point cloud data, including:

a memory; and at least one processor connected to the memory, wherein the at least one processor is further configured to:

decode geometry data of the point cloud data based on an octree; and decode attribute data for the point cloud data, wherein, to decode the attribute data, the at least one processor is further configured to:

decode attribute data for a first attribute for the point cloud data; and decode attribute data for a second attribute for the point cloud data, wherein, to decode the attribute data for the first attribute, the at least one processor is further configured to:

obtain subsampling method information from an attribute parameter set related to the first attribute in a bitstream;

based on a first value of subsampling method information, subsample a point of the point cloud data based on a spatial block, wherein the attribute parameter set related to the first attribute includes information related to a size of the spatial block; and wherein, to decode the attribute data for the second attribute, the at least one processor is further configured to:

obtain subsampling method information from an attribute parameter set related to the second attribute in the bitstream; and based on a second value of the subsampling method information, subsample a point of the point cloud data based on an index of the point and a subsampling period, wherein the attribute parameter set related to the second attribute further includes information for the subsampling period.

17. The device of claim 16, based on the first value of subsampling method information, the attribute parameter set related to the first attribute further includes information related to a subsampling direction, information related to a subsampling scan order, and information related to an index of the point, and based on the second value of the subsampling method information, the attribute parameter set related to the second attribute further includes information related to a subsampling offset.

18. The device of claim 16, wherein, to decode the attribute data, the at least one processor is further configured to:

based on a third value of the subsampling method information, subsample a point of the point cloud data based on a subsampling distance, wherein the bitstream further includes information related to the subsampling distance, or based on a fourth value of the subsampling method information, subsample a point of the point cloud data based on a Levels of Detail (LoD), wherein the bitstream further includes information related to a method of generating the LoD and information related to a level number including the point.

19. The device of claim 16, wherein the bitstream further includes information related to a reconstructing method, and information related to a number of one or more neighboring points of the point, and wherein the attribute data to be reconstructed is reconstructed based on attribute data of the one or more neighbor points.

20. The device of claim 19, wherein the bitstream further includes information related to a reference attribute representing a type of an attribute channel, and wherein the attribute data to be reconstructed is reconstructed further based on the attribute data of the reference attribute.

* * * * *